United States Patent
Russell, II et al.

(10) Patent No.: US 7,222,061 B2
(45) Date of Patent: May 22, 2007

(54) METHOD AND ARRANGEMENT FOR DEVELOPING ROD PATTERNS IN NUCLEAR REACTORS

(75) Inventors: William Earl Russell, II, Wilmington, NC (US); David Joseph Kropaczek, Kure Beach, NC (US); Steven Barry Sutton, Wilmington, NC (US); Christian Carlos Oyarzun, Wrightsville Beach, NC (US); William Charles Cline, Wilmington, NC (US); Carey Reid Merritt, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 733 days.

(21) Appl. No.: 10/321,441

(22) Filed: Dec. 18, 2002

(65) Prior Publication Data

US 2004/0122629 A1 Jun. 24, 2004

(51) Int. Cl.
- G06G 7/54 (2006.01)
- G21C 7/00 (2006.01)
- G21C 17/00 (2006.01)
- G21C 23/00 (2006.01)
- G09B 9/00 (2006.01)
- G09B 19/00 (2006.01)
- G09B 25/00 (2006.01)
- G06F 15/16 (2006.01)
- G06F 11/30 (2006.01)
- G06F 12/14 (2006.01)

(52) U.S. Cl. ............... 703/18; 434/218; 376/207; 376/245; 376/255; 376/317

(58) Field of Classification Search .......... 703/18; 434/218; 376/207, 245, 255, 317
See application file for complete search history.

(56) References Cited

U.S. PATENT DOCUMENTS 5,677,938 A * 10/1997 Gassmann ............... 376/237
5,790,616 A * 8/1998 Jackson ................... 376/245

(Continued)

OTHER PUBLICATIONS

Zhian Li, Samuel H. Levine, "Autoload, An Automated Optimal Pressurized Water Reactor Reload Design with an Expert Module" Nuclear Science and Engineering: 118, 1994, pp. 67-78.*

Han Gon Kim, Soon Heung Chang, Byung Ho Lee, "Optimal Fuel Loading Pattern Design Using Artificial Neural Netwrok and a Fuzzy Rule-based System" Nuclear Science and Engineering: 115, 1993 pp. 152-163.*

(Continued)

*Primary Examiner*—Paul Rodriguez
*Assistant Examiner*—Dwin McTaggart Craig
(74) *Attorney, Agent, or Firm*—Harness, Dickey & Pierce, P.L.C.

(57) ABSTRACT

In the method, a set of limits applicable to a test rod pattern design are defined, and a sequence strategy for positioning one or more subsets of the test rod pattern design is established. Reactor operation on a subset of the test rod pattern design, which may be a subset of fuel bundles in a reactor core for example, is simulated to produce a plurality of simulated results. The simulated results are compared against the limits, and data from the comparison is provided to indicate whether any of the limits were violated by the test rod pattern design during the simulation. A designer or engineer may use the data to determine which operator parameters need to be adjusted (e.g., control blade notch positions for example) in order to create a derivative rod pattern design for simulation, and eventually perfect a rod pattern design for a particular core.

39 Claims, 16 Drawing Sheets

U.S. PATENT DOCUMENTS

| | | | | |
|---|---|---|---|---|
| 5,923,717 A | * | 7/1999 | Fawks, Jr. | 376/245 |
| 6,075,529 A | * | 6/2000 | Tamegaya | 715/744 |
| 6,381,564 B1 | * | 4/2002 | Davis et al. | 703/22 |
| 6,404,437 B1 | * | 6/2002 | Russell et al. | 345/473 |

OTHER PUBLICATIONS

Lian Shin Lin, Chaung Lin, "A Rule-Based Expert System for Automatic Control Rod Pattern Generation for Boiling Water Reactors" Nuclear Technology vol. 95 Jul. 1991, pp. 1-8.*

* cited by examiner

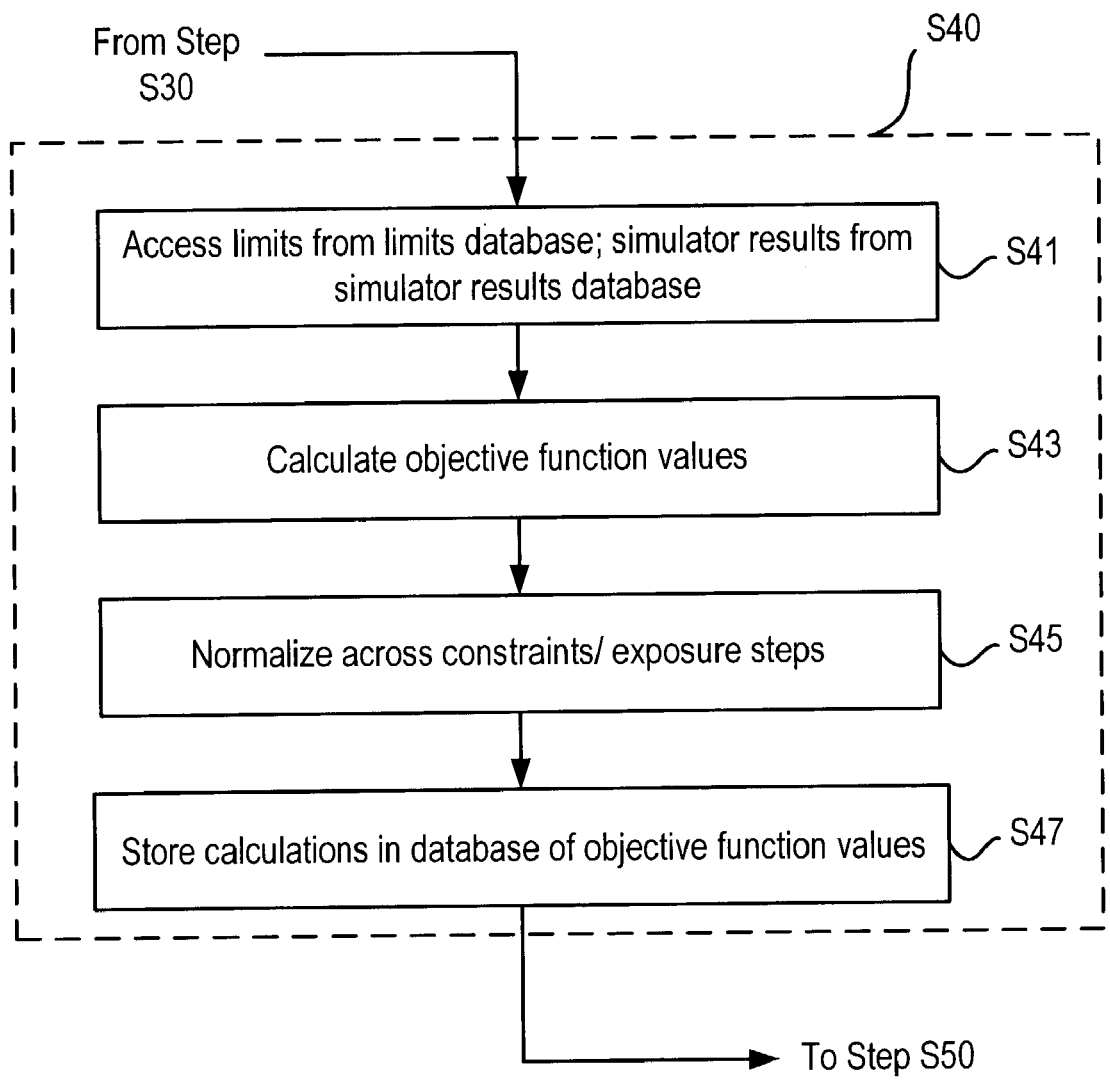

FIG. 8A

| Constraint Description | Importance | Exposure Dependence | Design Value | Objective Add Funct. | Optimization Credits |
|---|---|---|---|---|---|
| Maximum MFLCPR | Nominal | ☐ Edit | 0.964 | ☐ | None |
| Maximum MFLPD | Nominal | ☐ Edit | 0.957 | ☐ | None |
| Maximum MAPLHGR | Nominal | ☐ Edit | 0.957 | ☐ | None |
| Minimum % Flow | Nominal | ☐ Edit | 85.0 | ☐ | None |
| Maximum % Flow | Nominal | ☐ Edit | 100.0 | ☐ | None |
| Eigenvalue Upper Tolerance (Δ Cycle) | None | ☐ Edit | 1.0E-4 | ☐ | None |
| Eigenvalue Lower Tolerance (Δ Cycle) | None | ☐ Edit | 1.0E-4 | ☐ | None |
| EOC Eigenvalue Upper Tolerance | None | | 0.0 | ☐ | None |
| EOC Eigenvalue Lower Tolerance | Nominal | | 0.0 | ☐ | Nominal |
| Minimum Cycle Length (MWD/st) | None | | 11500.0 | ☐ | None |
| Maximum Nodal Exposure Ratio (NEXRAT) | None | | 0.0 | ☐ | None |
| Maximum Bundle Average Exposure @ EOC | None | | 0.0 | ☐ | None |
| Minimum % Shutdown Margin | Nominal | ☐ Edit | 1.5 | ☐ | None |
| Maximum % Hot Excess | None | ☐ Edit | 0.0 | ☐ | None |
| Minimum % SLICS Margin | None | ☐ Edit | 0.0 | ☐ | None |
| Minimum % Hot Excess @ 200 | None | | 0.0 | ☐ | None |
| Maximum Hot Excess Slope (%/(MWD/st)) | None | | 0.0 | ☐ | None |
| Minimum Average Void Fraction | None | ☐ Edit | 0.0 | ☐ | None |
| Maximum Average Void Fraction | None | ☐ Edit | 0.0 | ☐ | None |
| Minimum Axial Void Tilt (AVT) | None | ☐ Edit | 0.0 | ☐ | None |
| Maximum Axial Void Tilt (AVT) | None | ☐ Edit | 0.0 | ☐ | None |
| Minimum Axial Power Tilt (APT) | None | ☐ Edit | 0.0 | ☐ | None |
| Maximum Axial Power Tilt (APT) | None | ☐ Edit | 0.0 | ☐ | None |
| Minimum Axial Peak | None | ☐ Edit | 0.0 | ☐ | None |
| Maximum Axial Peak | None | ☐ Edit | 0.0 | ☐ | None |
| Maximum Integrated Power | None | ☐ Edit | 0.0 | ☐ | None |

FIG. 8B

FIG. 13 ePrometheus - Hatch 1 - Cycle 1 - Test 5b - CS10:2671 <Online Operation>

Figure 13:
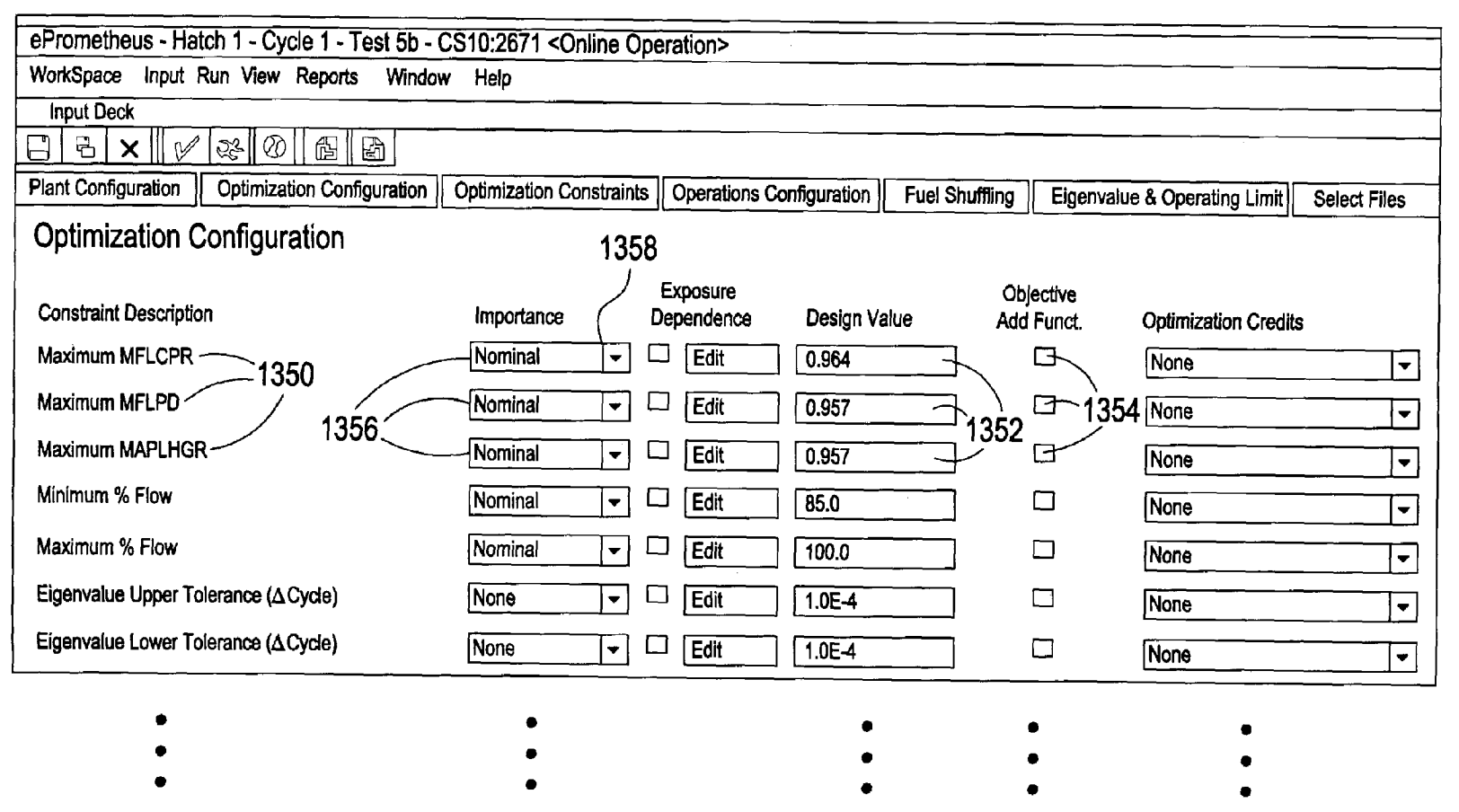

WorkSpace  Input  Run  View  Reports  Window  Help

Input Deck

| Plant Configuration | Optimization Configuration | Optimization Constraints | Operations Configuration | Fuel Shuffling | Eigenvalue & Operating Limit | Select Files |

Optimization Configuration

| Constraint Description | Importance | Exposure Dependence | Design Value | Objective Add Funct. | Optimization Credits |
|---|---|---|---|---|---|
| Maximum MFLCPR — 1350 | Nominal ▶ | ☐ | Edit  0.964 | ☐ | None ▶ |
| Maximum MFLPD  1356 | Nominal ▶ | ☐ | Edit  0.957 | ☐ 1354 | None ▶ |
| Maximum MAPLHGR | Nominal ▶ | ☐ 1358 | Edit  0.957  1352 | ☐ | None ▶ |
| Minimum % Flow | Nominal ▶ | ☐ | Edit  85.0 | ☐ | None ▶ |
| Maximum % Flow | None ▶ | ☐ | Edit  100.0 | ☐ | None ▶ |
| Eigenvalue Upper Tolerance (ΔCycle) | None ▶ | ☐ | Edit  1.0E-4 | ☐ | None ▶ |
| Eigenvalue Lower Tolerance (ΔCycle) | | | Edit  1.0E-4 | | |

METHOD AND ARRANGEMENT FOR DEVELOPING ROD PATTERNS IN NUCLEAR REACTORS

BACKGROUND OF THE INVENTION

1. Field of the Invention

This invention relates generally to nuclear reactors, and more particularly to identifying rod pattern designs for a core of a nuclear reactor.

2. Related Art

A core of a nuclear reactor such as boiling water reactor (BWR) or pressurized water reactor (PWR) has several hundred individual fuel bundles of fuel rods (BWR) or groups of fuel rods (PWR) that have different characteristics. These bundles (fuel rod groups) are preferably arranged so that interaction between rods within a fuel bundle (rod group), and between fuel bundles (fuel rod groups) satisfies all regulatory and reactor design constraints, including governmental and customer-specified constraints. Additionally, the rod pattern design, e.g., the arrangement of control mechanisms such as control blades (BWR) or control rods (PWR) within the core must be determined so as to optimize core cycle energy. Core cycle energy is the amount of energy that a reactor core generates before the core needs to be refreshed with new fuel elements, such as is done at an outage.

In the case of a BWR, for example, the number of potential bundle arrangements within the core and individual fuel element arrangements within a bundle may be in excess of several hundred factorial. From these many different possible configurations, only a small percentage of rod pattern designs may satisfy all applicable design constraints. Further, only a small percentage of these rod patterns designs, which do satisfy all applicable design constraints, are economical.

Traditionally, rod pattern design determinations have been made on a trial and error basis. Specifically, and based on only the past experience of the engineer or designer, in designing a rod pattern design an initial pattern design was identified. The initially identified rod pattern design was then simulated in a computer. If a particular design constraint was not satisfied, then the arrangement was modified and another computer simulation was run. Many weeks of resources typically were required before an appropriate rod pattern design was identified using the above-described procedure.

For example, a current process being used is a stand-alone manual rod pattern design process that requires a designer to repeatedly enter reactor plant specific operational parameters into an ASCII text file, which is an input file. Data entered into the input file includes blade notch positions of control blades (if the evaluated reactor is a boiling water reactor (BWR)), core flow, core exposure (e.g., the amount of burn in a core energy cycle, measured in mega-watt days per short time (MWD/st), etc.

A Nuclear Regulatory Commission (NRC) licensed core simulation program reads the resulting input file and outputs the results of the simulation to a text or binary file. A designer then evaluates the simulation output to determine if the design criteria has been met, and also to verify that no violations of margins to thermal limits have occurred. Failure to meet design criteria (i.e., violations of one or more limits) require a manual designer modification to the input file. Specifically, the designer would manually change one or more operation parameter and rerun the core simulation program. This process was repeated until a satisfactory rod pattern design was achieved.

This process is extremely time consuming. The required ASCII text files are laborious to construct, and often are error prone. The files are fixed-format and extremely long, sometimes exceeding five thousand or more lines of code. A single error in the file results in a crash of the simulator, or worse, results in a mildly errant result that may be hard to initially detect, but will profligate with time and iterations to perhaps reduce core cycle energy when placed in an actual operating nuclear reactor core.

Further, no assistance is provided via the manual iterative process in order to guide a designer toward a more favorable rod pattern design solution. In the current process, the responsible designer or engineer's experience and intuition are the sole means of determining a rod pattern design solution.

SUMMARY OF THE INVENTION

A method and arrangement for developing a rod pattern design for a nuclear reactor is described, where the rod pattern design represents a control mechanism for operating the nuclear reactor. In the method, a set of limits applicable to a test rod pattern design are defined, and a sequence strategy for positioning one or more subsets of the test rod pattern design are establish based on the limits. Reactor operation on a subset of the test rod pattern design, which may be a subset of fuel bundles in a reactor core for example, is simulated to produce a plurality of simulated results. The simulated results are compared against the limits, and data from the comparison is provided to indicate whether any of the limits were violated by the test rod pattern design during the simulation. Based on the data, a designer or engineer may be able to determine which operator parameters need to be adjusted (e.g., control blade notch positions for example) in order to create a derivative rod pattern design for simulation. In another embodiment, an optimization routine may be invoked, which iterates the above steps over a number of different rod pattern designs, constantly improving on violated limits in order to achieve an optimal rod pattern design to be used in a nuclear reactor core.

BRIEF DESCRIPTION OF THE DRAWINGS

The present invention will become more fully understood form the detailed description given herein below and the accompanying drawings, wherein like elements are represented like reference numerals which are given by way of illustration only and thus are not limitative of the present invention and wherein:

FIG. 6 is a flow chart illustrating the comparing step of FIG. 4 in more detail in accordance with an exemplary embodiment of the invention;

FIGS. 8–13 are screen shots of an exemplary computer-based application to further describe various features of the method and arrangement of the present invention.

DETAILED DESCRIPTION

Figure 1:
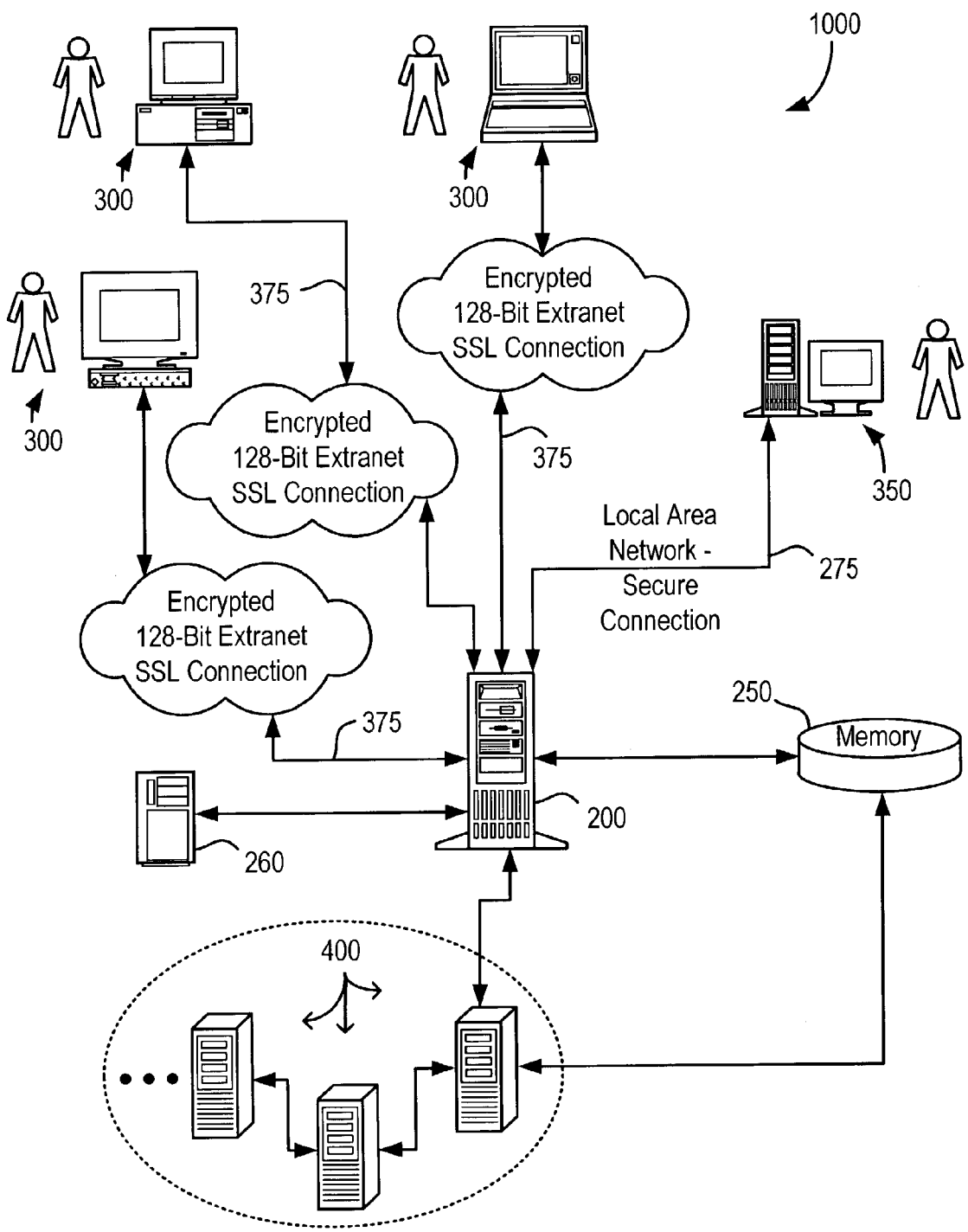
FIG. 1 illustrates an arrangement for implementing the method in accordance with an exemplary embodiment of the invention.

The method and arrangement for developing a rod pattern design for a nuclear reactor may include a graphical user interface (GUI) and a processing medium (e.g., software-driven program, processor, application server, etc.) to enable a user to virtually create rod pattern designs (e.g., notch positions and sequences for control blade patterns for BWRs, group sequences for control rod patters for PWRs, etc.) that may be reviewed on a suitable display device by the user. The arrangement provides feedback to the user, based on how closely a proposed rod pattern design solution meets user input limits or constraints for simulated nuclear reactor operation.

Beginning with an initial test rod pattern design, the user, via the GUI, inputs limits (e.g., limits may be plant specific constraint data for example) that are applicable to the test rod pattern design that will be simulated. For example, the constraint data or limits may be defined as a set of limiting or target operating and core performance values for a specific reactor plant or core energy cycle. The user, via the GUI, may then initiate a reactor simulation (e.g., a three dimensional simulation using simulation codes licensed by the NRC) of the test rod pattern design, and view results from the simulation. In one aspect, the method calculates an objective function to compare how closely a simulated rod pattern design meets the limits or constraints. An objective function is a mathematical equation that incorporates the constraints or limits and quantifies the rod pattern design's adherence to the limits. For example, based upon the results of the simulation and the calculated objection function values, the user, who may be a core designer, engineer or plant supervisor for example, is able to determine if a particular design meets the user's limit requirements (i.e., meets a maximum cycle energy requirement). Via the GUI, the user may then modify the test rod pattern design to create a derivative rod pattern design, and issue commands to repeat the simulation to determine if there is any performance improvement in the derivative rod pattern design. Further, the user, via the GUI, may iterate the functions (e.g., simulation, comparison of results to limits modify if limits volatile, etc.) over N rod pattern designs until a simulated design satisfies all limits, or satisfies all limits within a margin that is acceptable to the user.

The method and arrangement of the present invention provides several advantages. Firstly, the method and arrangement utilize a computing environment to effect a tenfold reduction in the amount of time needed to create desirable rod pattern design for a nuclear reactor. The method adheres perfectly to a user's input constraints or design limits (e.g., if the objective function is not equal to zero, the rod pattern design is not complete). The method and arrangement offer greater operational flexibility to change rod pattern designs rapidly and simulate the altered designs, as compared to the conventional manual iterative process. Errors are no longer made in attempting to generate a simulator input file, as described with respect to the manual iterative process.

FIG. 1 illustrates an arrangement for implementing the method in accordance with and exemplary embodiment of the invention. Referring to FIG. 1, arrangement 1000 includes an application server 200, which may serve as a central nexus of an accessible website, for example. The application server 200 may be embodied as any known application server, such as a WINDOWS 2000 application server, for example. Application server 200 may be operatively connected to a plurality of calculation servers 400, a cryptographic server 260 and to a memory 250. Memory 250 may be embodied as a relational database server, for example.

A plurality of external users 300 may communicate with application server 200 over a suitable encrypted medium such as an encrypted 128-bit secure socket layer (SSL) connection 375, although the present invention is not limited to this encrypted communication medium. A user 300 may connect to the application server 200 over the internet or from any one of a personal computer, laptop, personal digital assistant (PDA), etc., using a suitable interface such as a web-based internet browser. Further, application server 200 is accessible to internal users 350 via a suitable local area network connection (LAN 275), so that internal users 350 have access over an intranet for example. The application server 200 is responsible for online security, for directing all calculations and accessing of data in order to calculate objective function values, and for the creation of suitable graphical representations of various features of a rod pattern design that a user may review. The graphical information is communicated over the 128-bit SSL connection 375 or LAN 275 (to be displayed on a suitable display device of the users 300/350. Hereinafter, the term user refers to both an internal user 300 and an external user 300. For example, the user may be any of a representative of a nuclear reactor plant accessing the website to determine a rod pattern design for his or her nuclear reactor, and/or a vendor hired by a reactor plant site to develop rod pattern designs by using the method and arrangement of the present invention.

Figure 2:
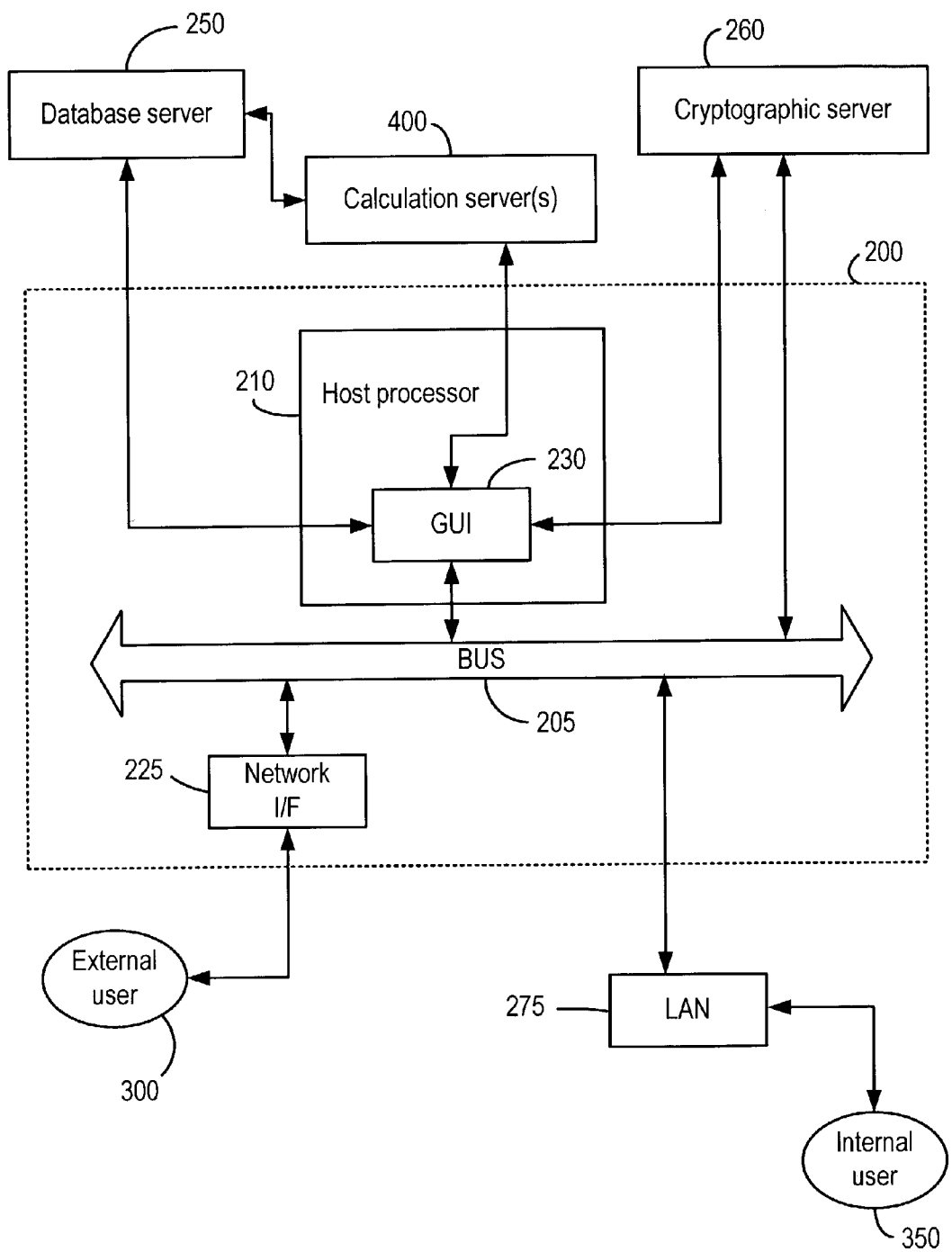
FIG. 2 illustrates an application server of the arrangement for implementing the method in accordance in an exemplary embodiment of the invention.

FIG. 2 illustrates an application server 200 associated with the arrangement of FIG. 1. Referring to FIG. 2, application server 200 utilizes a bus 205 to connect various components and to provide a pathway for data received from the users. Bus 205 may be implemented with conventional bus architectures such as peripheral components interconnect (PCI) bus that us standard in many computer architectures. Alternative bus architectures such as VMEBUS, NUBUS, address data bus, RAMbus, DDR (double data rate) bus, etc. could of course be utilized to implement bus 205. Users communicate information to application server 200 over a suitable connection (LAN 275 or network interface 225) to communicate with application server 200.

Application server 200 may also include a host processor 210, which may be constructed with conventional microprocessors such as currently available PENTIUM processors. Host processor 210 represents a central nexus from which all real time and non-real functions in application server 200 are performed, such as graphical-user interface (GUI) and browser functions, directing security functions, directing calculations such as calculation of the objective functions for various limits, etc., for display and review by the user. Accordingly, host processor 210 may include a GUI 230 which may be embodied in software as a browser. Browsers are software devices which present an interface to, and interact with, users of the arrangement 1000. The browser is responsible for formatting and displaying user-interface components (e.g., hypertext, window, etc.) and pictures.

Browsers are typically controlled and commanded by the standard hypertext, mark-up language (that's HTML). Additionally, or in the alternative, any decisions in control flow of the GUI 230 that require more detailed user interaction may be implemented using JavaScript. Both of these languages may be customized or adapted for the specific details of a given application server 200 implementation, and images may be displayed in the browser using well known JPG, GIF, TIFF and other standardized compression schemes, other non-standardized languages and compression schemes may be used for the GUI 230, such as XML, "home-brew" languages or other known non-standardized languages and schemes. Host processor 210 may be operatively connected to a cryptographic server 260. Accordingly, application server 200 implements all security functions by using the cryptographic server 260, so as to establish a firewall to protect the arrangement 1000 from outside security breaches. Further, cryptographic server 260 secures all personal information of registered users.

Application server 200 may be also operatively connected to a plurality of calculation servers 400. The calculation servers 400 may perform all the calculations required to process user entered data, direct simulation of a rod pattern design, calculate values for comparison as to be described in further detail below, and to provide results which may be displayed via, the GUI 230, under the direction of application server 200.

The calculation servers 400 may be embodied as WINDOWS 2000 servers, for example. More particularly, the calculation servers 400 may be configured to perform a multitude of complex computations which may include, but are not limited to, configuring the objective function and computing objective function values, executing a 3D simulator program to simulate reactor core operation on a particular test rod pattern design and to generate outputs from the simulation, providing results data for access and display by a user via GUI 230, and iterating an optimization routine as to be described in further detail below.

Figure 3:
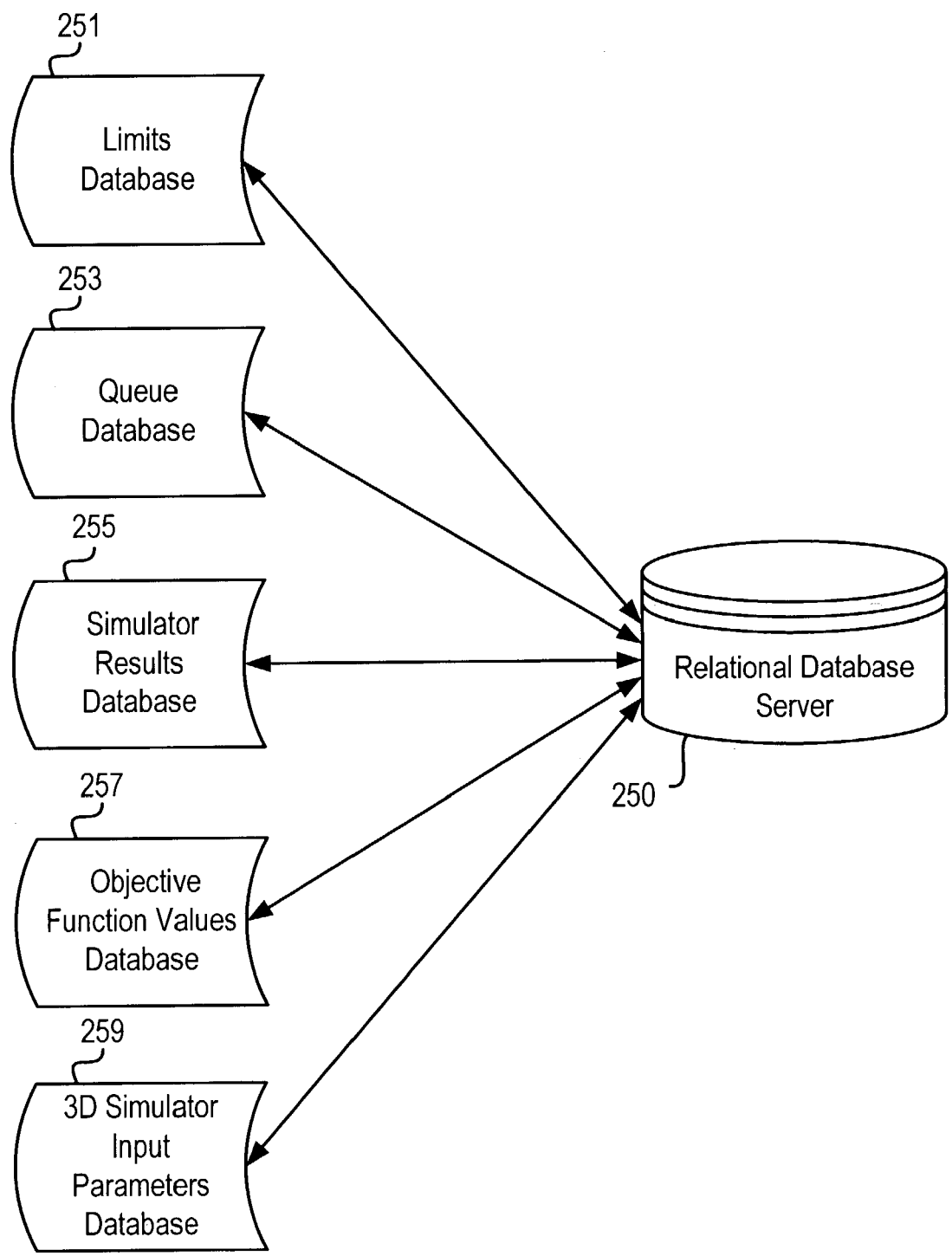
FIG. 3 illustrates a relational database having subordinate databases in accordance with an exemplary embodiment of the invention.

FIG. 3 illustrates an exemplary database server 250 in accordance with an exemplary embodiment of the invention. Memory or database server 250 may be a relational database such as an Oracle 8i Alpha ES 40 relational database server. Relational database server 250 may contain a number of subordinate databases that handle all the necessary data and results in order to implement the method of the present invention. For example, relational database server 250 may include storage areas which contain subordinate databases such as limits database 251, which is a database that stores all the user input limits and/or design constraints for all test rod pattern designs that are evaluated for a particular nuclear reactor. Additionally, relational database server 250 may include a queue database 253, which stores all parameters for a particular rod pattern design that are to be simulated in the 3D simulator. All simulator results may be stored in simulator results database 255. The simulator results database 255 (and limits database 251) may be accessed by the calculation servers 400 in order to calculate a number of objective function values that are applicable to a particular test rod pattern design. These objective function values may be stored in an objective function values database 257 within relational database server 250. A 3D simulator input parameters database 259 may also be included within relational database server 250. Database 259 may include the rod pattern positions and reactor operating parameters for all exposure steps. As the calculation servers 400 is operatively connected to, and may communicate with, relational database server 250, each of the subordinate databases described in FIG. 3 may be accessible to one or more calculation servers 400.

Figure 4:
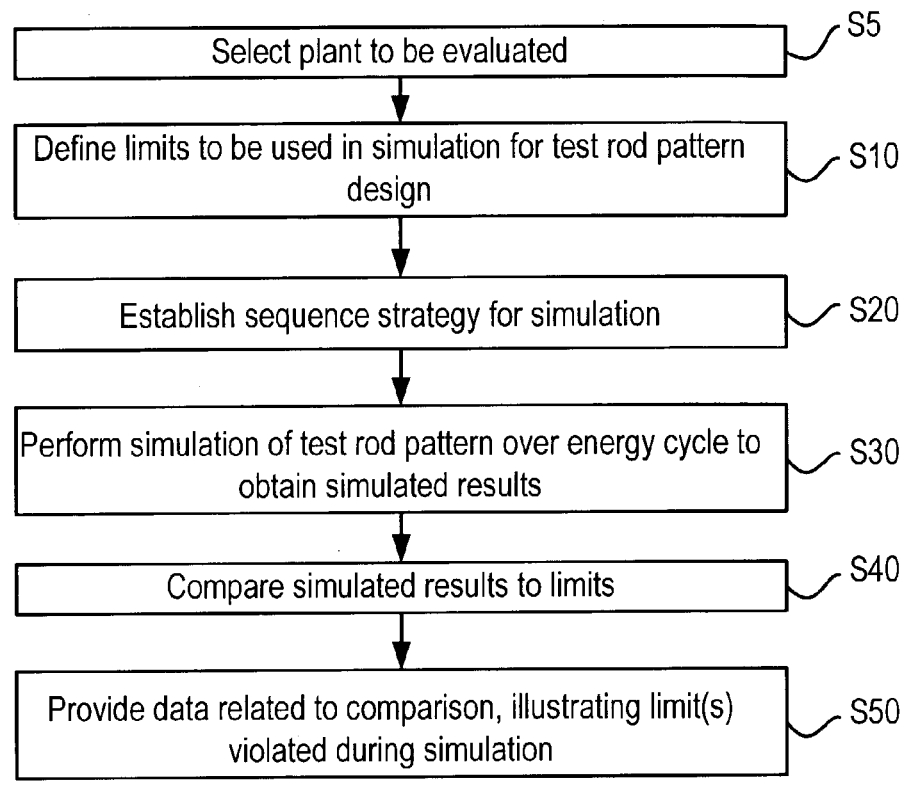
FIG. 4 is a flow chart describing the method in accordance with an exemplary embodiment of the invention.

FIG. 4 is a flow chart illustrating the method in accordance with an exemplary embodiment of the invention which is described in terms of a rod pattern design for an exemplary boiling water reactor, it being understood that the method and arrangement are applicable to PWRs, gas-cooled reactors and heavy-water reactors.

Referring to FIG. 4, a reactor plant is selected for evaluation in Step S5 and limits which are to used in a simulation for a test rod pattern design of the selected plant are defined (Step S10). Based on the limits, sequence strategy for control mechanism movement (e.g., control blade notch positions, control rod positions, etc.) is established (Step S20). Reactor operation may be simulated (Step S30) on the entire core design, or focused on a subset of the test rod pattern design, which may be a subset of fuel bundles in a reactor core for example, in order to produce a plurality of simulated results. The simulated results are compared to the limits (Step S40), and based on the comparison, data is provided illustrating whether any limits have been violated (Step S50). The data also provides the user with an indication of which location in a simulated core were the largest violators or largest contributors to a limit violation. Each of these steps are now described in further detail below.

FIGS. 8–13 are screen shots describing an exemplary computer-based application to further describe various features of the method and arrangement of the present invention. These figures may be occasionally referred to in the following description of the inventive method and arrangement. Initially, a reactor plant is selected (Step S5) so that an initial test rod pattern design may be chosen. The reactor plant may be selected from a stored list, such as is stored on an accessible database such as relational database 250 for example. The reactor to be evaluated may be any of a BWR, PWR, gas-cooled reactor or heavy water reactor, for example. Data from previously evaluated plants may be stored, and the plant listed under a suitable accessible folder such as may be accessed via a suitable input device (mouse, keyboard, plasma touch screen, etc.) and GUI 230. A plant may be chosen, and an initial test rod pattern design may be selected. The initial test rod pattern may be selected from a rod pattern design used in a previous simulation, selected based on a rod pattern design from a reactor that is similar to the reactor being evaluated, and/or from an actual rod pattern design used in an earlier core energy cycle in the reactor plant being evaluated.

Once the plant is selected, an initial rod pattern design may be selected by entering a previous test design using GUI to access a plant configuration webpage. For example, the webpage may enable to user to select a "model size", e.g., quarter core, half core, or full core, for evaluation in a subsequent simulation. Additionally, a user may select a core symmetry option (e.g., octant, quadrant, no symmetry) for the selected model size, by clicking on a suitable drop down menu and the like.

By selecting "octant symmetry", the user can model the reactor assuming that all 8 octants (where an octant is a group of fuel bundles for example) are similar to the modeled octant. Consequently, simulator time is generally increased by a factor of eight. Similarly, by selecting "quadrant symmetry", the user can model the reactor assuming each of the 4 quadrants are similar to the modeled quadrant.

Hence, the simulator time is generally increased by a factor of four. If asymmetries in bundle properties prevent octant or quadrant symmetry, the user can also specify no symmetry.

A set of limits applicable to the test rod pattern design is defined (Step S10). These limits may be related to key aspects of the design of the particular reactor being evaluated and design constraints of that reactor. The limits may be applicable to variables that are to be input for performing a simulation of the test rod pattern design, and may be limit applicable only to the results of the simulation. For example, the input limits may be related to client-inputted reactor plant specific constraints and core performance criteria. Limits applicable to the simulation results may be related to one or more of operational parameter limits used for reactor operation, core safety limits, margins to these to these operational and safety limits and the other client-inputted reactor plant specific constraints. FIG. 8A illustrates client-inputted plant specific constraints, which may be configured as limits on input variables to the simulation and limits on the simulation results. Referring to FIG. 8A, there is listed a plurality of client-inputted plant specific constraints as indicated generally by the arrow 805. For each constraint, it is possible to assign a design value limit, as indicated by column 810.

A sequence strategy for positioning one or more subsets of a test rod pattern design is established (Step S20) based on the limits. In an embodiment where the reactor being evaluated is a boiling water reactor, for example, the limits help to establish allowable control blade positions and durations. Control blade themes are defined together with allowable blade symmetry to aid the user in determining an initial sequence strategy. In typical BWR operation, for example, the control blades may be divided into four groups of blades ("A1", "A2", "B1", and "B2"). By apportioning blades into these blade groups, the user may easily identify only the permissible blades within a given sequence. Consequently, undesirable blades are prevented from being used, which would result in an undesirable solution. Because control blade themes are identified for each exposure, satisfactory blade definitions may be forced.

By defining control blade themes and blade symmetry, the user need only identify a single blade position within the control blade theme, and the other symmetric control blades will accordingly follow. Thus, the graphical area is not cluttered by redundant control blade location information. Further, automating a sequence strategy prevents illegal control blade position errors from occurring.

Figure 8B:
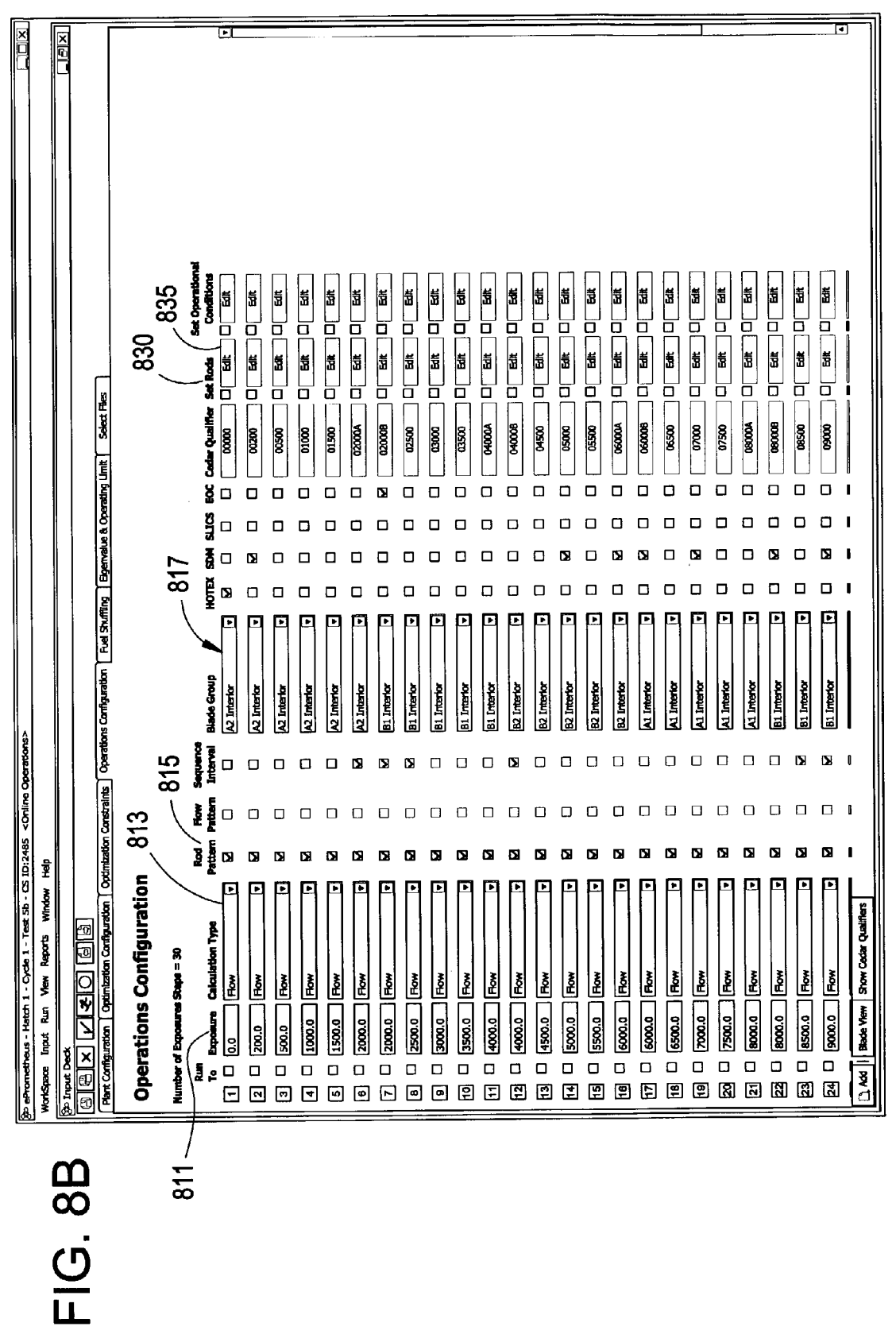

The user proceeds to identify all sequences and the initial rod pattern determination from a beginning of cycle (BOC) to end of cycle (EOC). FIG. 8B is a graphical illustration of how the control blade sequence may be entered. The column entitled blade group, at 817, enables the user to adjust or set the sequence strategy based on what user constraints have already been entered, for example. In FIG. 8B, the user has set the exposure steps at 811, calculation type at 813, detailed rod pattern at 815, blade groups at 817 and any appropriate operation parameters.

With the limits having been defined and the sequence strategy having been established, a simulation is initiated (Step S30). The simulation may be executed by calculation servers 400; however, the simulation may be a 3D simulation process that is run external to the arrangement 1000. The user may employ well-known executable 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

Thus, the user may initiate a 3D simulation at any time using GUI 230, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Data related to the simulation may be queued in queue database 253 within relational database server 250. Once the simulation is queued, the user may have an audio and/or visual indication as to when the simulation is complete, as is known.

Figure 5:
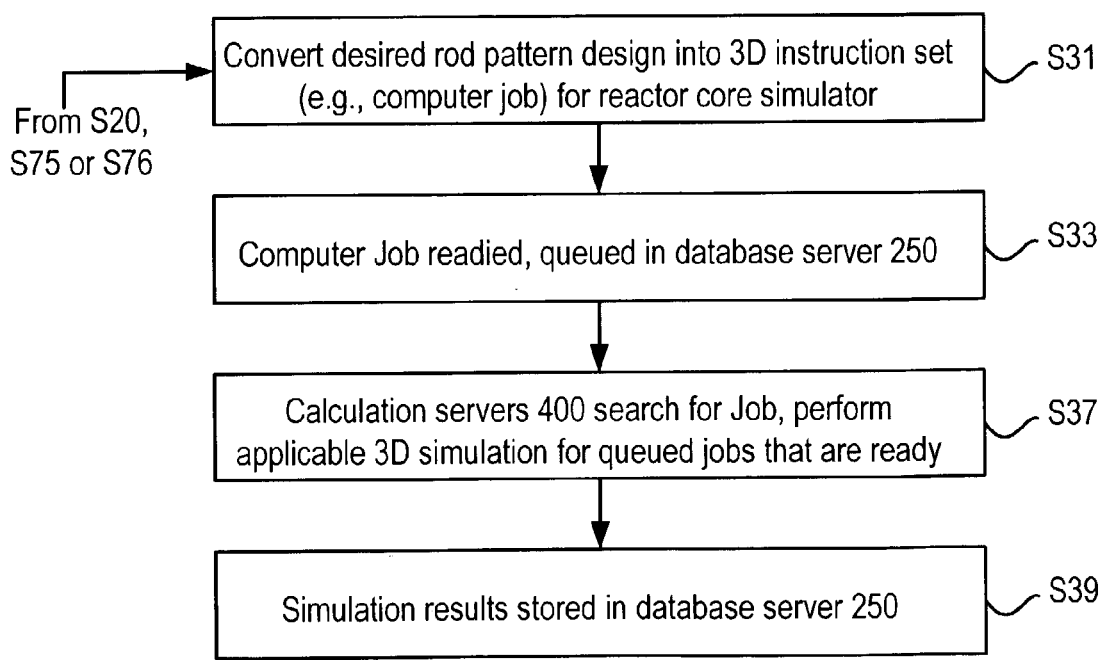
FIG. 5 is a flow chart illustrating a simulation step in accordance with an exemplary embodiment of the invention.

Once the user initiates simulation, many automation steps follow. FIG. 5 is a flow chart illustrating simulation Step S30 in further detail. Initially, all definitions for the rod pattern design problem are converted into a 3D instruction set (e.g., a computer job) for the 3D reactor core simulator (Step S31). This enables the user to have a choice of several types of simulators, such as the simulators described above. Selection of a particular simulator may be dependant on the plant criteria entered by the user (e.g. the limits). The computer job is readied for queuing in the queue database 253 of each relational database server 250 (Step S33). The storing of the data for a particular simulation enables any potential simulation iteration to start from the last or previous iteration. By storing and retrieving this data, future simulation iterations to a rod pattern design take only minutes or seconds to perform.

Concurrently, a program running on each of the available calculation servers 400 scans every few seconds to look for available jobs to run (Step S37). If a job is ready to run, one or more of the calculation servers 400 obtains the data from the queue database 253 and runs the appropriate 3D simulator. As described above, one or more status messages may be displayed to the user. Upon completion of the simulation, all results of interest may be stored in one or more subordinate databases within the relational database server 250 (e.g., simulation results database 255). Accordingly, the relational database server 250 may be accessed in order to calculate the objective function values for the test rod pattern design.

FIG. 6 is a flow diagram illustrating the comparing step of FIG. 4 in further detail. The objective function may be stored in relational database server 250 for access by calculation servers 400. Objective function calculations, which provide objective functions values, may also be stored in the relational database server 250, such as in a subordinate objective function value database 257. Referring to FIG. 6, inputs to the objective function calculation include the limits from the limits database 257 and the simulator results from the simulator results database 255. Accordingly, one or more calculation servers 400 access this data from relational database server 250 (Step S41).

Although the method and arrangement of the present invention envision any number of objection function formats that could be utilized, one embodiment includes an objective function having three components: (a) the limit for a particular constraint parameter (e.g., design constraint for reactor plant parameter), represented as "CONS"; the simulation result from the 3D simulator for that particular constraint parameter, represented as "RESULT", and a multiplier for the constraint parameter, represented by "MULT". A set of predefined MULTs may be empirically determined from a large collection of BWR plant configurations, for example. These multipliers may be set at values that enable reactor energy, reactivity limits, and thermal limits to be determined in an appropriate order. Accordingly, the method of the present invention utilizes a generic set of empirically-determined multipliers, which may be applied to over thirty different core designs. However, GUI 230 permits manual changing of the multipliers, which is significant in that user preference may desire certain constraints to be "penalized" with greater multipliers than the multipliers identified by the pres-set defaults.

An objective function value may be calculated for each individual constraint parameter, and for all constraint parameters as a whole, where all constraint parameters represent the entity of what is being evaluated in a particular test rod pattern. An individual constraint component of the objective function may be calculated as described in Equation (1):

$$OBJ_{par} = MULT_{par} * (RESULT_{par} - CONS_{par}); \qquad (1)$$

where "par" may be any of the client-inputted constraints listed in FIG. 8A. It is to be understood that these parameters are not the only parameters that could be possible candidates for evaluation, but are parameters which are commonly used in order to determine a suitable core configuration for a nuclear reactor. The total objective function may be a summation of all constraint parameters, or $$OBJ_{TOT} = SUM(par=1, 31) \{OBJ_{par}\} \qquad (2)$$

Referring to Equation 1, if RESULT is less than CONS (e.g. there is no violation of a constraint), the difference is reset to zero and the objective function will be zero. Accordingly, objective function values of zero indicate that a particular constraint has not been violated. Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, the rod pattern is modified only at the identified exposure step.

In addition, objective function values may be calculated as a function of each exposure step, and totaled for the entire test rod pattern design problem (Step S43). The objective function values calculated for each constraint, and the objective function values per exposure step, may be further examined by normalizing each objective function value to provide a percentage contribution of a given constraint to a total objective function value (Step S45). Each result or value of an objective function calculation is stored in a subordinate objective function value database 257 within relational database server 250.

The objective function values may be utilized in the manual determination of rod pattern development. For example, the values of the objective function calculations may be viewed graphically by the user in order to determine parameters that violate limits. Additionally, any change in objective function values over successful iterations of rod pattern design provides the user with a gauge to estimate both improvement and detriment in their proposed design.

Increases in an objective function value over several iterations indicate that the user's changes are creating a rod pattern design that is moving away from a desired solution, while successive iterations of lesser objective functions values (e.g., the objective function value decreasing from a positive value towards zero) may indicate improvements in the iterative rod pattern design. The objective function values, limits and simulation results over successive iterations may be stored in various subordinate databases within relational database server 250. Therefore, designs from past iterations may be quickly retrieved, should later modifications prove unhelpful.

Figure 9:
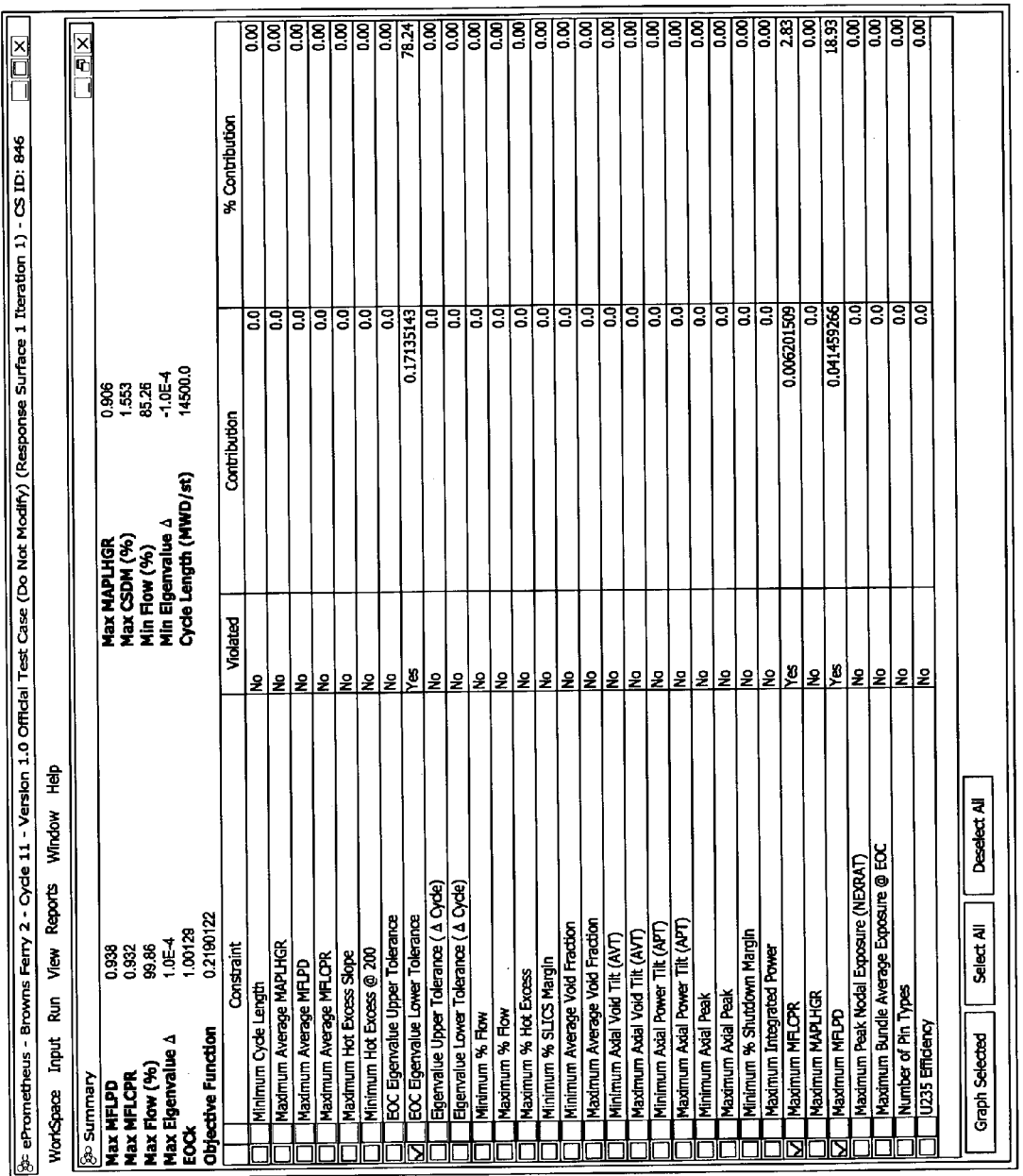

Upon completion of the objective function calculation, the user may be provided with data related to the objective function calculations, which may include limits that have been violated during the simulation of an evaluated test rod pattern design. FIG. 9 illustrates exemplary graphical data which a user may review. Referring to FIG. 9, there is displayed a list of constraint parameters which may represent the input limits, and the values of each of objective function value calculation on a per constraint basis. FIG. 9 illustrates limits which have been violated with a check in a box, as indicated by checked box 905 for example. Additionally, for each limit violation, its contribution and percent (%) contribution (based on the calculations and the normalization routines described with respect to FIG. 6), are displayed. Accordingly, based on this data, the user may be provided with a recommendation as to what modifications need to be made to the test rod pattern design for a subsequent iteration.

Although the individual rod pattern modifications may alternatively be left to the desires of the user, procedural recommendations may be provided in the form of a pull down menu, for example. These recommendations may be divided into four categories: energy beneficial moves, reactivity control, energy detrimental moves, and converting excessive margin (from thermal limit) into additional energy. A preferred technique is to address problems using energy beneficial moves rather than energy detrimental moves. Even if the rod pattern design meets all of the limits (client-inputted plant specific constraints, design limits, thermal limits, etc.) the user may verify that any excessive margin to a particular limit is converted into additional energy. Accordingly, the following logic statements may represent the above procedural recommendations:

Energy Beneficial Moves
If peaking off top of blade, insert blade deeper
If NEXRAT (e.g., a thermal margin constraint) problem at EOC, insert blade deeper earlier in cycle
If kW/ft peaking during mid cycle, drive deeper rods deeper earlier in cycle Reactivity Control
If flow too high during sequence, pull deep rods
If flow too low during sequence, drive rods deeper Energy Detrimental Moves
If peaking at bottom of core during sequence, insert shallow blade in local area Converting Excessive Margin into Additional Energy
If extra MFLCPR margin at EOC, drive blades deeper earlier in cycle
If extra kW/ft margin EOC, drive blades deeper earlier in cycle
If extra MFLCPR margin in center of core at EOC, drive center rods deeper earlier in cycle Based on the location, and on the time exposure of limit violations, as indicated by the objective function, a user may easily follow one or more of the above recommendations to address and fix constraint violations.

The data resulting from the objective function calculations may be interpreted on a suitable display device. For example, this data may be displayed as a list of constraints with denoted violators, as described with respect to FIG. 9. However, the user may access a number of different "result"

display screens that may configurable as 2- or 3-dimensional views, for example. The following Table 1 lists some of the exemplary views available to the user.

TABLE 1

GRAPHICAL VIEWS AVAILABLE TO USER

Figure 10:
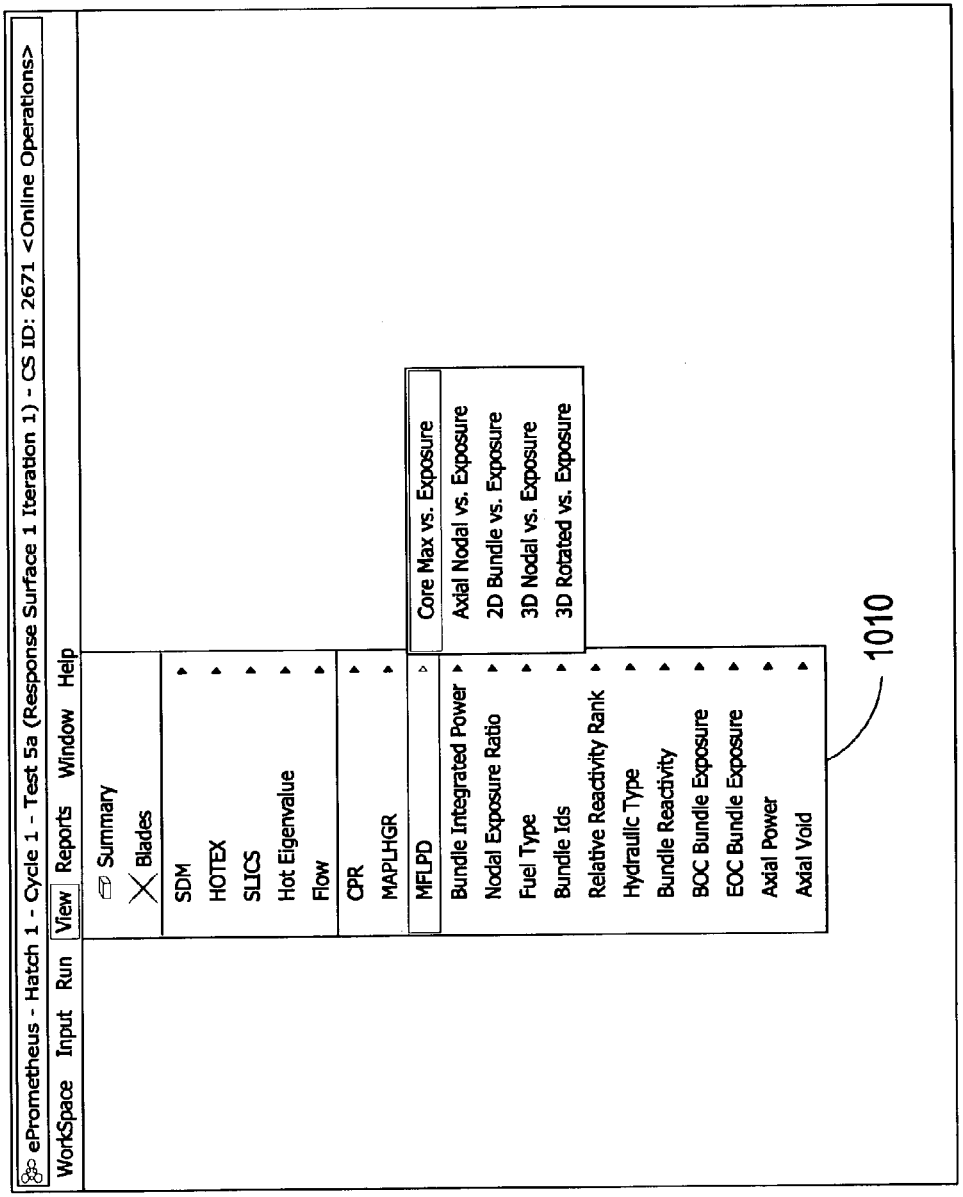
Figure 11A:
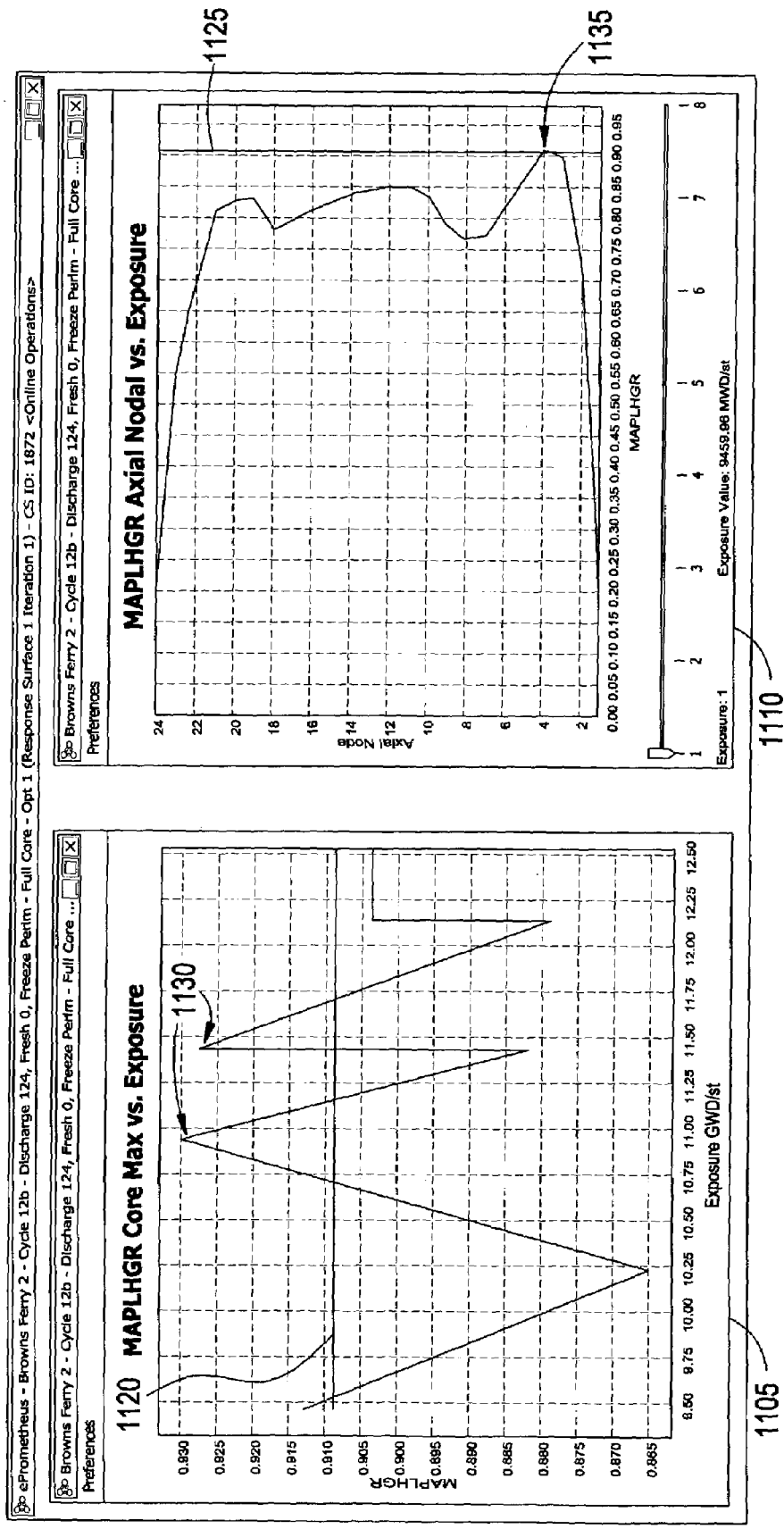
Figure 11B:
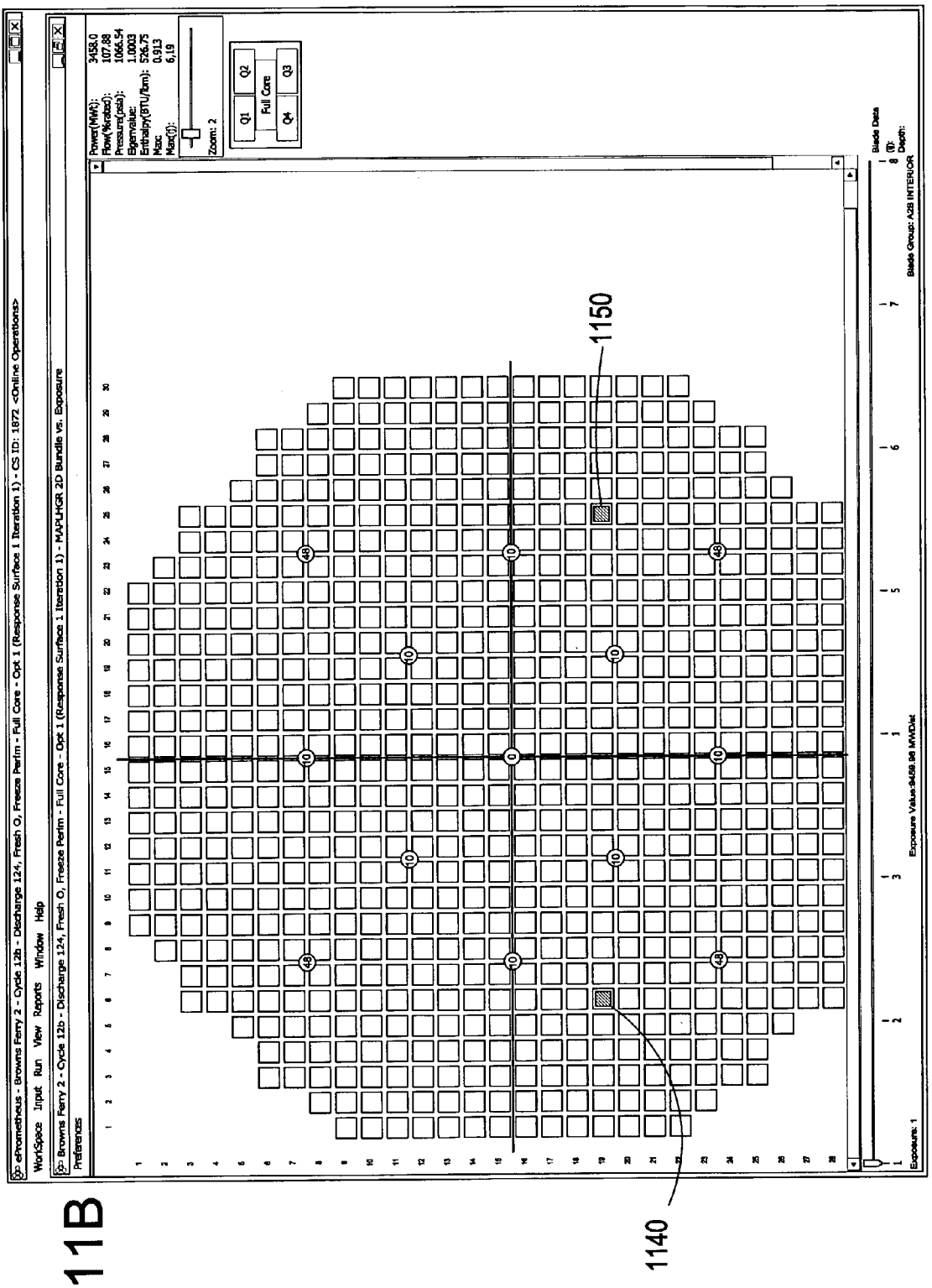

Objective function results - listing
Graph of max core value vs. exposure
Graph of nodal maximum value vs. exposure
Graph of location of max core value vs. exposure
Graph of pin value vs. exposure
Graph of bundle maximum value vs. exposure
View 3D rotational diagram
Report performance relative to previous iteration
Report improvement rates of various designers
Display of server status
Display of queue status
Display system recommendations FIGS. 10–11B illustrate graphical views available to the user in accordance with the invention. Referring to FIG. 10, a user may pull down a suitable drop down menu from a "view" icon on a task bar in order to display views of certain constraints or parameters. As illustrated in FIG. 10, a user has selected a Maximum Fractional Limiting Power Density (MFLPD) constraint parameter. There are a number of different graphical views available to the user, as indicated by pull-down menu 1010. The user simply selects the desired view and may then access a page such as is illustrated in FIGS. 11A or 11B. FIG. 11A illustrates two different 2-dimensional graphs of particular constraints, as seen at 1105 and 1110. For example, the user can determine where violations of Maximum Average Planar Heat Generation Rate (MAPLHGR) occur (in a core maximum vs. exposure graph 1105, and an axial values of MFLPD vs. exposure graph 1110) for a particular exposure in a core cycle. The limits for these constraints are shown by lines 1120 and 1125, with violations shown generally at 1130 and 1135 in FIG. 11A.

FIG. 11B illustrates another view, in this case a two dimensional view of an entire cross section of a core, in order to see where the biggest violation contributors for MAPLHGR vs. exposure are located. As can be seen at 1140 and 1150, the encircled squares represent the fuel bundles that are the largest violation contributors to MAPLHGR in the core (e.g., 1140 and 1150 pointing to bundles violating MAPLHGR). This gives the user an indication of which fuel bundles in the rod pattern design may need modification.

Figure 7A:
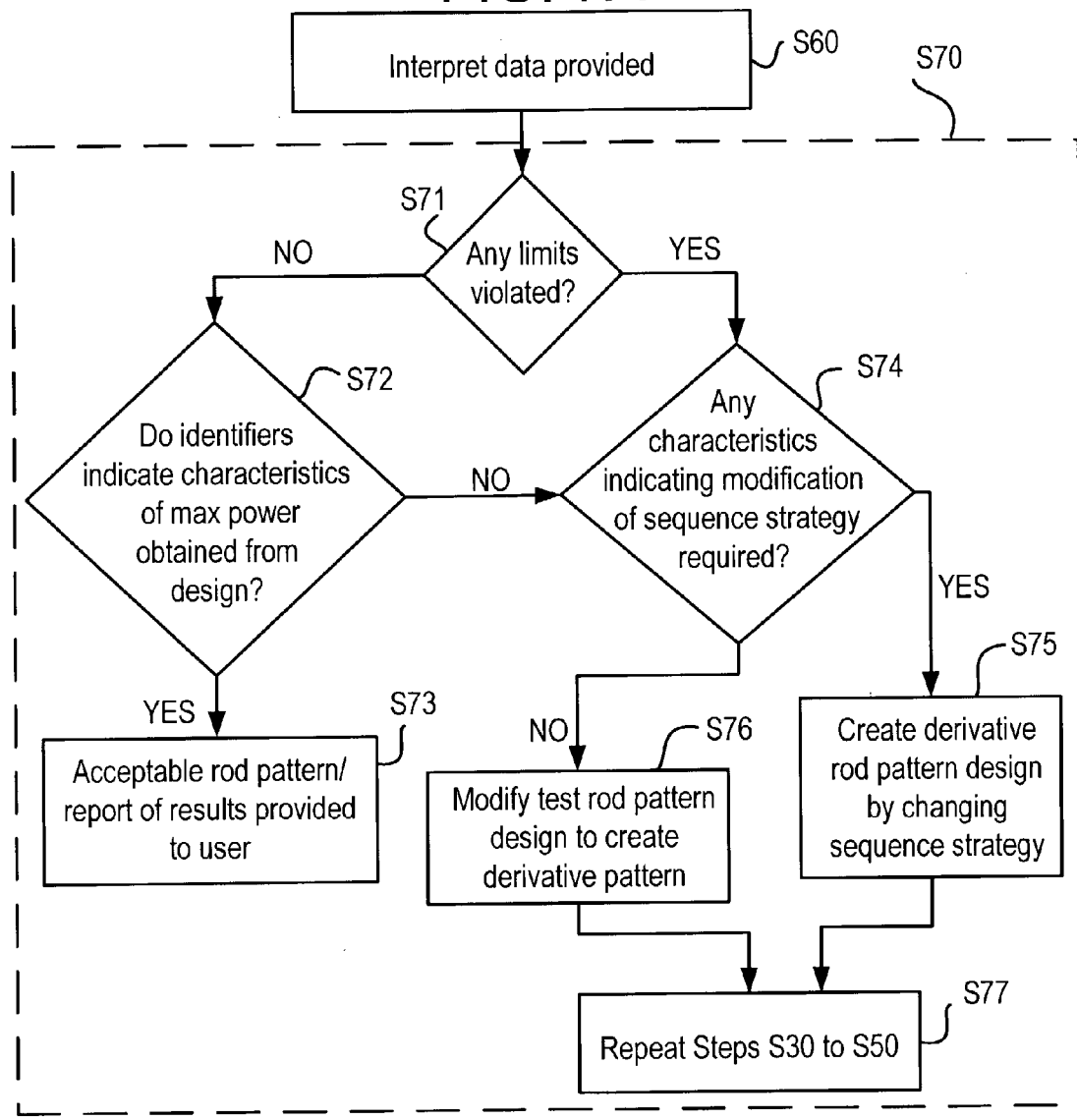
FIGS. 7A and 7B are flow charts illustrating the modification of a rod pattern design and an iterative process in accordance with an exemplary embodiment of the invention.
Figure 7B:
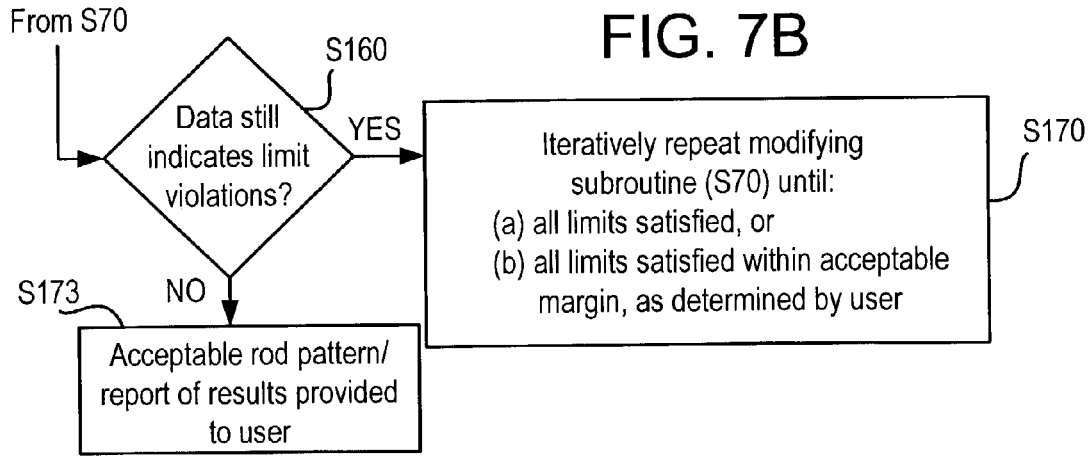

FIGS. 7A and 7B are flow diagrams describing modification and iteration processing steps in accordance with an exemplary embodiment of the invention. Referring to FIG. 7A, by interpreting the data at Step S60, the user may be inclined to initiate a modifying subroutine (Step S70). In all practicality, the first test rod pattern design will not be an acceptable design, and the modifying subroutine will be required. In one embodiment, the user can manually direct this modifying subroutine, with the help of the graphical user GUI 230. In another embodiment, the subroutine may be performed within the bounds of an optimization algorithm that automatically iterates simulation, calculation of objective function and evaluation of the results or values of the objective function calculations for a number of rod pattern design iterations.

The user determines, based on the displayed data, whether any limits are violated (Step S71). If no limits are violated, the user determines if any identifiers indicate that characteristics of maximum power are obtained from the rod pattern design. For example, these identifiers may include an indication of good thermal margin utilization (such as margins on MFLCPR and LHGR) by driving rods deeper into the core to maximize plutonium generation for cycle extension. Power requirements may be shown to be met when the minimum EOC eigenvalue is obtained for the cycle design (eigenvalue search) or the desired cycle length is determined at a fixed EOC eigenvalue. If there is an indication that max power has been obtained from the test rod pattern design (the output of Step S72 is YES), an acceptable rod pattern design has been determined, and the user may access a report of the results related to the rod pattern design (Step S73).

If limits are violated (the output of Step S71 is YES) or limits are not violated but there is an indication that max power has not been obtained from the rod pattern design (the output Step S72 is NO) then the user determines whether any characteristics indicate that modification of the sequence strategy is required (Step S74). Characteristics that indicate a need to modify the sequence strategy may include excessive control blade (control rod) history, excessive MFLCPR at EOC in local areas and inability to contain MFLCPR at individual exposures. Additionally, if several iterations of rod pattern design changes have been attempted and there has been no real improvement to the objective function, this is a further indication that an alternative rod pattern sequence might need to be explored.

Accordingly, if the sequence strategy requires modification (the output of Step S74 is YES), the user creates a derivative rod pattern design by changing the sequence strategy (Step S75). For example, and referring to FIGS. 8B and 8C, the user may select an edit option on the operations configuration page to change the blade groupings (see 817 in FIG. 8B).

Figure 8C:
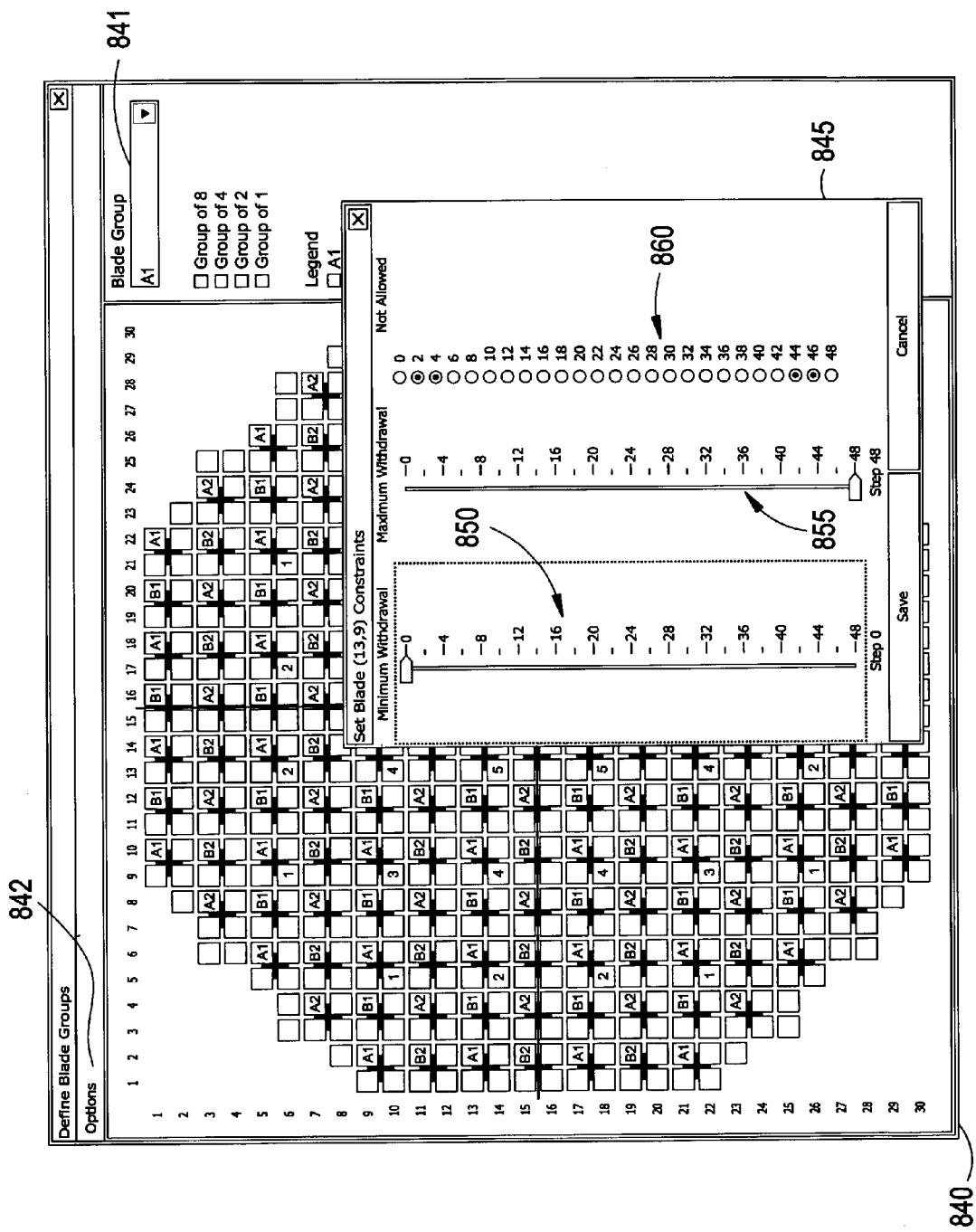

If there are no characteristics indicating that the sequence strategy needs to be modified (the output of Step S74 is NO) the user may modify the test rod pattern design to create a derivative pattern by changing positions of control blades or control rods. Referring to FIG. 8B, the user checks a "set rods" box 830 for a particular exposure and selects edit icon 835. As shown in FIG. 8C, these operations may bring up another display that enables the user to manually alter the notch positions of the control blades in a particular group. In FIG. 8C, there is shown a "Define Blade Groups" screenshot 840, which illustrates a core cross section with a blade group Interior A1 selected at cell 841. By selecting options pull down menu 842, the user may display another window called a "Set Blade Constraints" window 845. The minimum withdrawal column 850 identifies how far a blade is allowed into the core. The maximum withdrawal column 855 identifies how far the blade is allowed out of the core, at the Not Allowed column 860 identifies blade locations that are not allowed for this particular rod pattern design. It is to be understood that the present invention is not limited to changing control blade notch positions for boiling water reactors, but also to changing rod position of control rods in pressurized water reactors, as well as control rod positions in other types of reactors (e.g., gas cooled reactor, heavy water reactors, etc.).

Regardless of whether the test rod pattern was modified by changing rod positions or modified by changing sequence strategy, Steps S30-S50 are repeated to determine if the derivative rod pattern design meets all limits (Step S77). This may become an iterative process.

FIG. 7B illustrates the iterative process in accordance with an exemplary embodiment of the invention. For each derivative rod pattern design that has been simulated, the user determines whether any data that is related to the comparison between simulated results and limits (e.g., the calculated objective function values) still indicates that there are limit violations. If not, the user has developed an acceptable rod pattern design that may be used in a particular reactor, and may access graphical results related to the acceptable rod pattern design (Step S173).

If an iteration still indicates that limits are violated (the output of Step S160 is YES) then the modifying subroutine in Step S70 is iteratively repeated until all limits are satisfied, or until all limits are satisfied within a margin that is acceptable, as determined by the user (Step S170). The iterative process is beneficial in that it enables the user to fine tune a rod pattern design, and to perhaps extract even more energy out of an acceptable rod pattern design than was previously possible of doing with the conventional, manual iterative process. Further, incorporation of the relational database server 250 and a number of calculation servers 400 expedite calculations. The iterative process as described in FIG. 7B may be done in an extremely short period of time, as compared to a number of weeks using the prior art manual iterative process of changing one parameter at a time, and then running a reactor core simulation.

To this point, the method and arrangement of the present invention have been described in terms of a user or designer interpreting data via GUI 230 and modifying a test rod pattern design iteratively, by hand, based on displayed feedback (the data from the objective function) in order to get a desired design. However, the aforementioned steps of FIGS. 7A and 7B may also be effectuated by way of an optimization process. The optimization process iterates the steps in FIGS. 7A and 7B over a number of different rod pattern designs, constantly improving on violated limits in order to achieve an optimal rod pattern design to be used in a nuclear reactor core.

Figure 12:
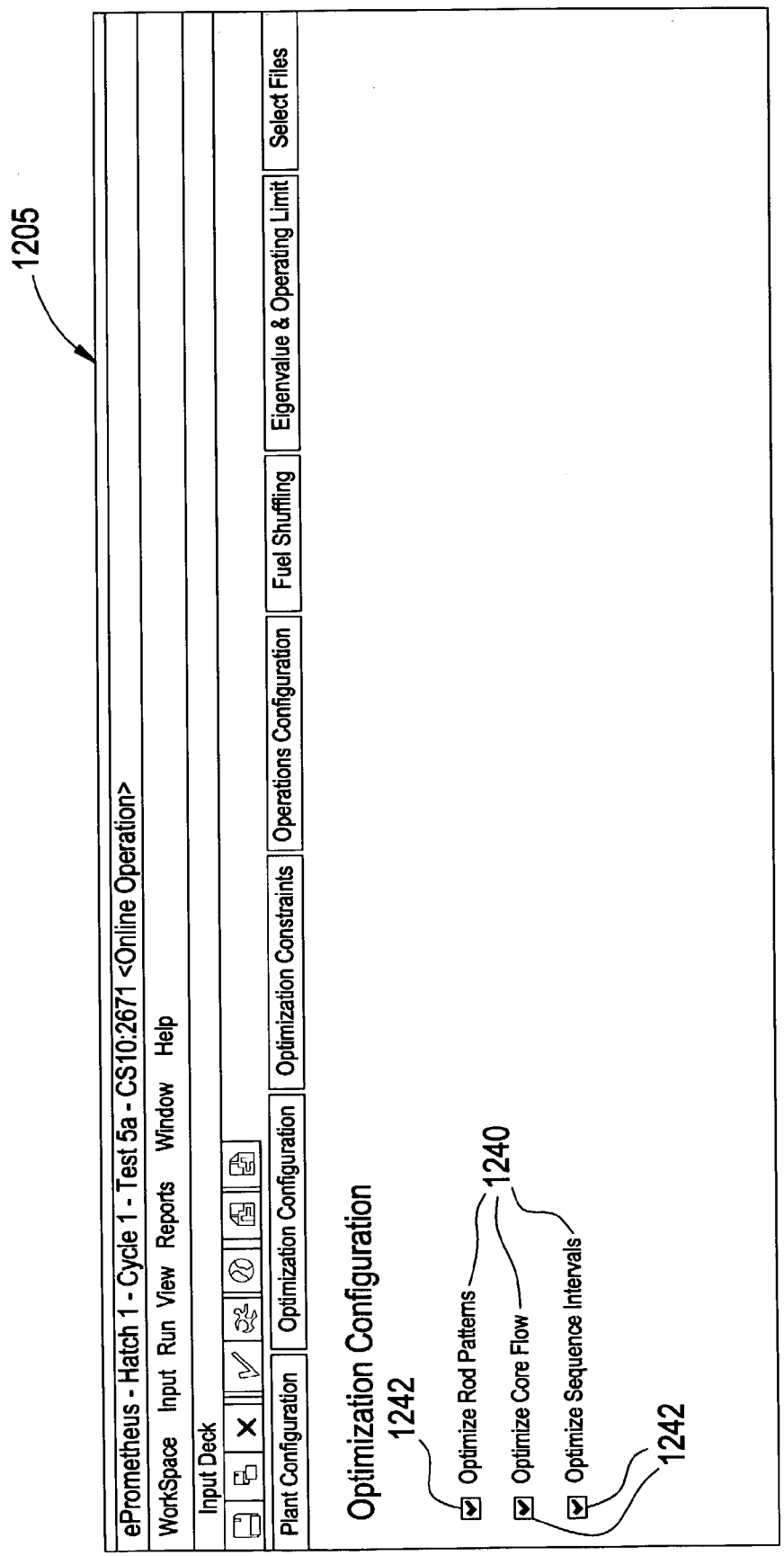

FIG. 12 illustrates a screen shot to initiate such a process. For example, after selecting the plant and the test rod pattern, the user may display an optimization configuration screen 1205. The user may select optimization parameters 1240 of optimize rod patterns, optimize core flow, and optimize sequence intervals, for example.

Optimize rod patterns means making an optimal determination of individual control rod positions within a control rod grouping (called a sequence), for the duration of time during the operating cycle when the given sequence is being used to control the reactor. Rod positions affect the local power as well as the nuclear reaction rate. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using a suitable input device (e.g., keyboard, mouse, touch display, etc.), the user may select, via GUI 230, one or more of the optimization parameters by clicking in the selection box 1242 associated with an optimization parameter 1240. When selected, a check appears in the selection box 1242 of the selected optimization parameter. Clicking in the selection box 1242 again de-selects the optimization parameter.

Memory (relational database server) 250 may also store constraint parameters associated with the optimization problem. These may be stored in limits database 251 for example. The constraint parameters are parameters of the optimization problem that must or should satisfy a constraint or constraints, where a constraint may be analogous to the limits described above.

FIG. 13 illustrates a screen shot of an exemplary optimization constraints page listing optimization constraints associated with an optimization problem of boiler water reactor core design. As shown, each optimization constraint 1350 has a design value 1352 associated therewith. Each optimization constraint must fall below the specified design value. The user has the ability to select optimization parameters for consideration in configuring the objective function. The user selects an optimization constraint by clicking in the selection box 1354 associated with an optimization constraint 1350. When selected, a check appears in the selection box 1354 of the selected optimization constraint 1350. Clicking in the selection box 1354 again de-selects the optimization constraint.

Each optimization parameter may have a predetermined credit term and credit weight associated therewith stored in relational database server 250. Similarly, each optimization constraint has a predetermined penalty term and penalty weight associated therewith, which may be stored in relational database server 250, such as in limits database 251 and/or objective function values database 257. As seen in FIG. 13, the penalty term incorporates the design value, and the user can change (i.e., configure) this value as desired. Additionally, the embodiment of FIG. 13 allows the user to set an importance 1356 for each optimization constraint 1350. In the importance field 1358 for an optimization constraint, the user may have pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

Additionally, this embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. patent application Ser. No. 10/246,718, entitled METHOD AND APPARATUS FOR ADAPTIVELY DETERMINING WEIGHT FACTORS WITHIN THE CONTEXT OF AN OBJECTIVE FUNCTION, by the inventors of the subject application, filed on Sep. 19, 2002.

Optimization Using the Objective Function

Figure 14:
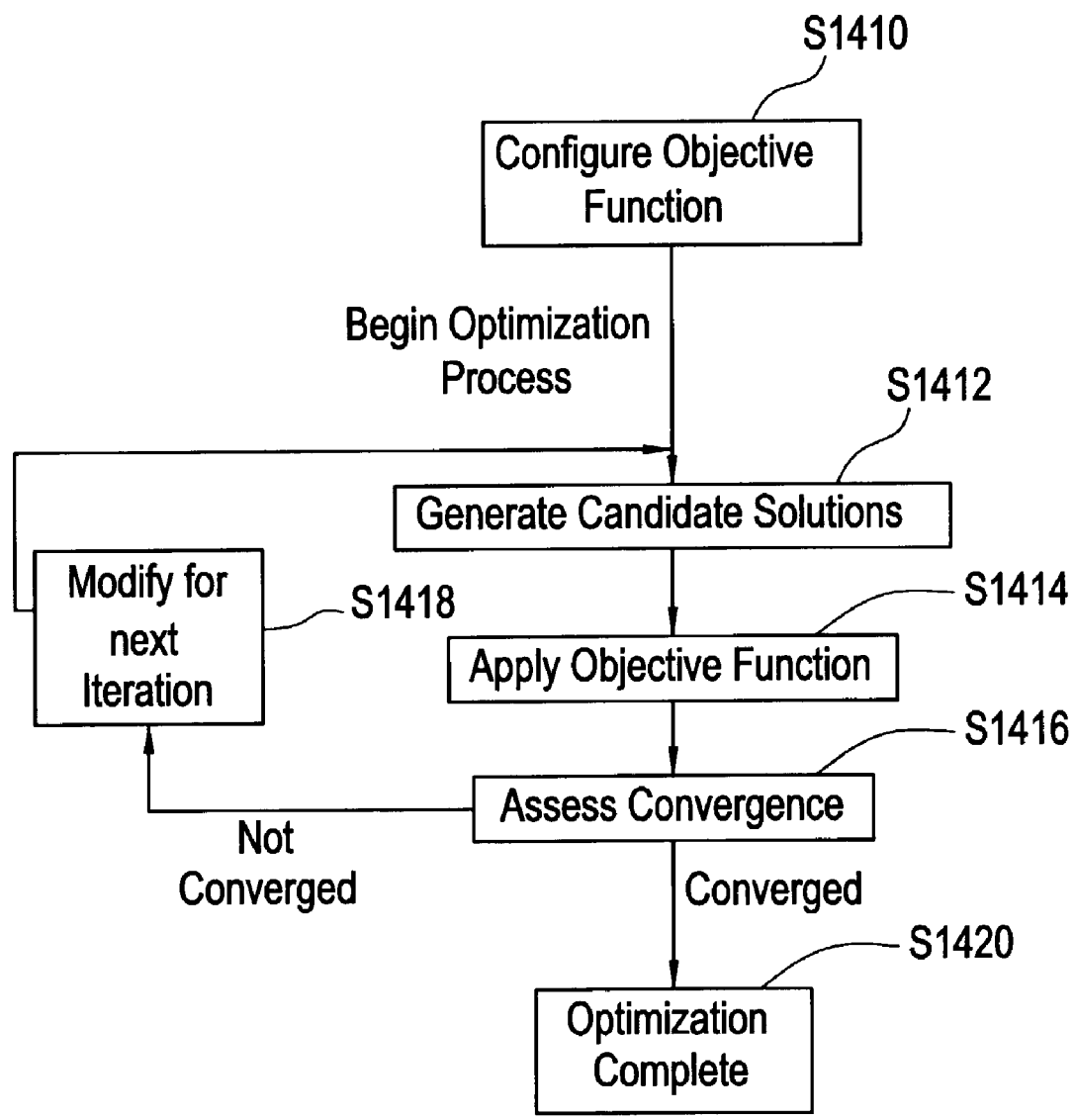
FIG. 14 is a flow chart describing an optimization routine used in accordance with an exemplary embodiment of the invention.

FIG. 14 illustrates a flow chart of an optimization process employing the objective function in accordance with an exemplary embodiment of the present invention. This optimization process is disclosed in U.S. patent application Ser. No. 10/246,716, entitled METHOD AND APPARATUS FOR EVALUATING A PROPOSED SOLUTION TO A CONSTRAINT PROBLEM, by the inventors of the subject application, filed on Sep. 19, 2002.

For the purposes of explanation only, the optimization process of FIG. 14 will be described as being implemented by the architecture illustrated in FIG. 1. As shown, in Step S1410 the objective function is configured as discussed above in the preceding section, then the optimization process begins. In Step S1412, the calculation processors 400 retrieve system inputs from relational database 250, or generate one or more sets of values for input parameters (i.e., system inputs) of the optimization problem based on the optimization algorithm in use. For example, these input parameters may be related to determining rod patterns for a bundle. However, optimization is not limited to using these parameters, as other input parameters might be placement of fresh and exposed fuel bundles within the reactor, selection of the rod groups (sequences) and placement of the control rod positions within the groups as a function of time during the cycle, core flow as a function of time during a cycle, reactor coolant inlet pressure, etc.

Each input parameter set of values is a candidate solution of the optimization problem. The core simulator as described above runs a simulated operation and generates a simulation result for each input parameter set of values. The simulation result includes values (i.e., system outputs) for the optimization parameters and optimization constraints. These values, or a subset of these values, are values of the variables in the mathematical expressions of the objective function.

Then, in step S1414, a calculation processor 400 uses the objective function and the system outputs to generate an objective function value for each candidate solution. In step S1416, the calculation processor 400 assesses whether the optimization process has converged upon a solution using the objective function values generated in step S1414. If no convergence is reached, then in step S1418, the input parameter sets are modified, the optimization iteration count is increased and processing returns to step S1412. The generation, convergence assessment and modification operations of steps S1412, S1416 and S1418 are performed according to any well-known optimization algorithm such as Genetic Algorithms, Simulated Annealing, and Tabu Search. When the optimization is utilized to determine an acceptable rod pattern design, the optimization is run until convergence (e.g., acceptable results as in steps S73/S173 of FIGS. 7A and 7B) is obtained.

The technical effect of the invention is a computer-based arrangement that provides a way to efficiently develop a rod pattern design for a nuclear reactor, where the rod pattern design represents a control mechanism for operating the reactor, as well as a computer-based method for providing internal and external users the ability to quickly develop, simulate, modify and perfect a rod pattern design for their reactor.

The invention being thus described, it will be obvious that the same may be varied in many ways. For example, as a method of developing a rod pattern design for a nuclear has having been described, a nuclear reactor such as a BWR may be configured to operate using a rod pattern design developed in accordance with the method outlined above. Such variations are not to be regarded as a departure from the spirit and scope of the invention, and all such modifications as would be obvious to one skilled in the are intended to be included within the scope of the following claims.

What is claimed is:

1. A method of developing a rod pattern design for a nuclear reactor, the rod pattern design representing a control mechanism for operating the reactor, comprising the steps of:
    defining a set of limits applicable to a test rod pattern design, wherein a rod pattern design is one of a design for notch positions and sequences of control blades in a boiling water reactor core and a design of group sequences for control rods in a pressurized water reactor core;
    establishing, based on the limits, a sequence strategy for positioning one or more subsets of the test rod pattern design;
    simulating reactor operation on at least a subset of the test rod pattern design to produce a plurality of simulated results;
    comparing the simulated results against the limits; and
    providing data indicative of limits that were violated by the test rod pattern design during the simulation.

2. The method of claim 1, further comprising:
    storing information related to the test rod pattern design, limits, simulated results and data from the comparison.

3. The method of claim 1, wherein the defining step further includes:
    defining input limits applicable to variables that are to be input for performing the simulating step; and
    defining result limits applicable to the simulated results, wherein the input limits and result limits are evaluated in the comparing step.

4. The method of claim 3, wherein the input limits are related to client-inputted plant specific constraints and core performance criteria.

5. The method of claim 3, wherein the result limits are related to at least one of operational parameter limits used for reactor operation, core safety limits, margins to those operational and safety limits and client-inputted plant specific constraints.

6. The method of claim 1, wherein the comparing step further comprises:
    configuring an objective function to evaluate the simulated results; and
    generating objective function values for each simulated result using the objective function; and
    evaluating the objective function values based on the defined set of limits to determine which of the simulated results violate a limit.

7. The method of claim 1, wherein the providing step further comprises providing data related to an acceptable rod pattern design, if the comparing step indicates that all limits have been satisfied, or satisfied within an acceptable margin.

8. The method of claim 1, further comprising:
    modifying the test pattern design to create a derivative rod pattern design; and
    repeating the simulating, comparing an providing steps to develop data indicating limits that were violated by the derivative rod pattern design during the simulation.

9. The method of claim 8, further comprising:
iteratively repeating the modifying, simulating, comparing and providing steps to develop N iterations of the derivative rod pattern design, and, for selected ones of the N iterations,
storing information related to the rod pattern design, limits, simulated results and data from the comparison.

10. The method of claim 9, wherein the iteratively repeating step is performed until the comparing in a particular iteration indicates that all limits have been satisfied, or satisfied within an acceptable margin, the method further comprising:
outputting data related to an acceptable rod pattern design for the nuclear reactor.

11. The method of claim 1, further comprising;
selecting a type of nuclear reactor, wherein the reactor is selected from a group comprising a boiling water reactor, a pressurized water reactor, a gas-cooled reactor and a heavy water reactor.

12. An arrangement for developing a rod pattern design for a nuclear reactor, the rod pattern design representative of a control mechanism for operating the reactor, comprising:
a memory storing a test rod pattern design, wherein a rod pattern design is one of a design for notch positions and sequences of control blades in a boiling water reactor core and a design of group sequences for control rods in a pressurized water reactor core;
an interface receiving a set of limits applicable to the test rod pattern design and enabling a sequence strategy for positioning subsets of the rod pattern design based on the limits to be established;
a simulator for running a simulation reactor operation on at least a subset of the rod pattern design to produce a plurality of simulated results, and
a processor comparing the simulated results against the limits,
the interface providing data indicating limits that were violated by the test rod pattern design during the simulation.

13. The arrangement of claim 12, wherein the memory is further configured to store information related to the test rod pattern design, limits, simulated results and data from the comparison, the memory accessible by at least one of the processor, simulator and a user communicating with at least one of the processor and simulator via the interface.

14. The arrangement of claim 12, wherein the interface is a graphical user interface (GUI).

15. The arrangement of claim 14, wherein the GUI includes color dynamics to illustrate simulated results that have violated one or more of the limits.

16. The arrangement of claim 15, wherein the GUI communicates with a user over one of an internet or intranet.

17. The arrangement of claim 16, wherein the user is at least one of a client communicating with the GUI to generate a desired plant-specific rod pattern design for the client's nuclear reactor, and a designer using the arrangement to provide a desired plant-specific rod pattern design for the client's nuclear reactor.

18. The arrangement of claim 16, wherein the user enters limits into the memory via the GUI.

19. The arrangement of claim 18, wherein the user-entered limits are related to plant-specific core performance parameters and plant-specific constraints on operational reactor parameters.

20. The arrangement of claim 18, wherein the sequence strategy established by the processor is based on the user-entered limits.

21. The arrangement of claim 12, wherein the processor provides procedural recommendations to a user, via the interface, for modifying rod pattern designs, based on whether the test rod pattern design violates one or more of the limits.

22. The arrangement of claim 13, wherein
the memory further stores an objective function that is based on a generic objective function definition being a sum of a first number of credit terms plus a sum of a second number of penalty terms,
the limits received by the interface includes credit term variables related to credit terms of the objective function and penalty term variables related to penalty terms of the objective function, and
the processor, based on the credit term variables and penalty term variables, evaluates the simulated results using the objective function to generate an objective function value for each simulated result.

23. The arrangement of claim 12, wherein, in response to data indicating the violation of one or more limits by the test rod pattern design,
the interface receives a command modifying the test rod pattern design to create a derivative rod pattern design;
the simulator repeats the simulation on the derivative rod pattern design,
the processor compares the simulated results against the limits, and
the interface provides data indicating limits that were violated by the derivative rod pattern design during the simulation.

24. The arrangement of claim 23, wherein, in response to data for every Nth derivative rod pattern design indicating the violation of one or more limits,
the interface, simulator and processor perform N iterations of rod pattern design modification, simulation, comparison and data providing functions, and, for selected ones of the N iterations,
the memory stores information related to rod pattern design, limits, simulated results and data from the comparison.

25. The arrangement of claim 24, wherein
the interface, simulator and processor perform said N iterations until the processor determines, in a particular iteration, that all limits have been satisfied, or satisfied within an acceptable margin, and
the interface outputs data related to an acceptable rod pattern design for the nuclear reactor.

26. The arrangement of claim 25, wherein the acceptable rod pattern design is embodied as one of a control blade configuration and a control rod configuration.

27. The arrangement of claim 12, wherein
the limits further comprise limits applicable to variables that are to be input for performing the simulation, and result limits applicable to the simulated results.

28. The arrangement of claim 27, wherein
the input limits are related to client-inputted plant-specific constraints and core performance criteria, and
the result limits are related to at least one of operational parameter limits used for reactor operation, core safety limits, margins to those operational and safety limits and client-inputted plant-specific constraints.

29. The arrangement of claim 12, wherein the test rod pattern design is embodied as one of a control blade configuration and a control rod configuration.

30. The arrangement of claim 12, wherein the reactor is selected from a group comprising a boiling water reactor, a pressurized water reactor, a gas-cooled reactor and a heavy water reactor.

31. A method of performing rod pattern design for a nuclear reactor, comprising:
   receiving a set of limits input by a user that are applicable to a test rod pattern design, wherein a rod pattern design is one of a design for notch positions and sequences of control blades in a boiling water reactor core and a design of group sequences for control rods in a pressurized water reactor core;
   simulating reactor operation on at least a subset of the test rod pattern design to produce a plurality of simulated results;
   comparing the simulated results against the limits;
   displaying data indicative of limits that were violated by the test rod pattern design during the simulation for review by the user, and
   modifying the test rod pattern design based on the displayed data to create a derivative rod pattern design, unless all limits have been satisfied, or satisfied within a margin that is acceptable to the user.

32. The method of claim 31, further comprising:
   storing information related to the test rod pattern design, limits, simulated results and data from the comparison.

33. The method of claim 31, further comprising:
   iteratively repeating the simulating, comparing, displaying and modifying steps to develop N iterations of the derivative rod pattern design until the comparing in a particular iteration indicates that all limits have been satisfied, or satisfied within an acceptable margin; and
   outputting data related to an acceptable rod pattern design for the nuclear reactor.

34. A computer program product comprising a computer-readable medium having computer program logic stored thereon for enabling a processor of the product to provide data for determining a rod pattern design for a nuclear reactor, the computer program logic causing the processor to perform the steps of:
   accepting limits related to a design rod pattern design, the limits being input by a user having electronic access thereto, wherein a rod pattern design is one of a design for notch positions and sequences of control blades in a boiling water reactor core and a design of group sequences for control rods in a pressurized water reactor core;
   selecting a test rod pattern design based on the limits;
   simulating reactor operation on at least a subset of the test rod pattern design to produce a plurality of simulated results;
   comparing the simulated results to the limits; and
   displaying data indicative of limits that were violated by the test rod pattern design during the simulation for review by the user.

35. The computer program product of claim 34, the computer program logic further causing the processor to perform the step of:
   accepting user-input commands to modify the test rod pattern design so as to create a derivative rod pattern design.

36. The computer program product of claim 35, the computer program logic further causing the processor to perform the steps of:
   iteratively repeating the simulating, comparing, displaying and modifying steps to develop N iterations of the derivative rod pattern design until a particular iteration indicates that all limits have been satisfied, or satisfied within an acceptable margin; and
   outputting data related to an acceptable rod pattern design for the nuclear reactor.

37. An application server for developing a rod pattern design for a nuclear reactor, the rod pattern design representative of a control mechanism for operating the reactor, comprising:
   means for accessing a memory storing a test rod pattern design, wherein a rod pattern design is one of a design for notch positions and sequences of control blades in a boiling water reactor core and a design of group sequences for control rods in a pressurized water reactor core;
   means for receiving a set of limits applicable to the test rod pattern design;
   means for enabling a sequence strategy for positioning subsets of the rod pattern design based on the limits to be established;
   means for directing a simulation of reactor operation on at least a subset of the rod pattern design to produce a plurality of simulated results, and
   means for directing a comparison of the simulated results against the limits,
   means for providing data indicating limits that were violated by the test rod pattern design during the simulation.

38. A method of operating a nuclear reactor using a rod pattern design developed in accordance with the method of claim 1.

39. The method of claim 38, wherein the nuclear reactor is one of a boiling water reactor, a pressurized water reactor, a gas-cooled reactor and a heavy water reactor.

* * * * *